(12) United States Patent
Springer et al.

(10) Patent No.: US 12,311,205 B2
(45) Date of Patent: May 27, 2025

(54) MODULAR POWERED AIR PURIFYING RESPIRATOR SYSTEM

(71) Applicant: Immediate Response Technologies, LLC, Jessup, MD (US)

(72) Inventors: Sean Springer, Crofton, MD (US); Daren Olsen, New Market, MD (US); Steve Tourison, Glen Burnie, MD (US)

(73) Assignee: Immediate Response Technologies, LLC, Jessup, MD (US)

( * ) Notice: Subject to any disclaimer, the term of this patent is extended or adjusted under 35 U.S.C. 154(b) by 353 days.

(21) Appl. No.: 17/714,063

(22) Filed: Apr. 5, 2022

(65) Prior Publication Data

US 2022/0331621 A1    Oct. 20, 2022

Related U.S. Application Data

(63) Continuation of application No. 16/190,415, filed on Nov. 14, 2018, now Pat. No. 11,291,869.

(60) Provisional application No. 62/586,393, filed on Nov. 15, 2017.

(51) Int. Cl.
| | |
|---|---|
| *A62B 18/02* | (2006.01) |
| *A62B 18/00* | (2006.01) |
| *A62B 18/10* | (2006.01) |
| *F04D 27/00* | (2006.01) |
| *G05D 7/06* | (2006.01) |
| *A62B 7/02* | (2006.01) |
| *A62B 7/10* | (2006.01) |
| *A62B 9/00* | (2006.01) |

(52) U.S. Cl.
CPC ............ *A62B 18/02* (2013.01); *A62B 18/006* (2013.01); *A62B 18/10* (2013.01); *F04D 27/004* (2013.01); *G05D 7/0676* (2013.01); *A62B 7/02* (2013.01); *A62B 7/10* (2013.01); *A62B 9/006* (2013.01); *F05D 2270/335* (2013.01)

(58) Field of Classification Search
CPC ....... A62B 18/02; A62B 18/006; A62B 18/10; A62B 7/02; A62B 9/006; A62B 7/10
See application file for complete search history.

(56) References Cited

U.S. PATENT DOCUMENTS

| | | | | |
|---|---|---|---|---|
| 2005/0217676 A1* | 10/2005 | Parker | ..................... | G09F 9/305 |
| | | | | 128/205.23 |
| 2007/0235030 A1* | 10/2007 | Teetzel | ..................... | A62B 9/04 |
| | | | | 128/205.12 |
| 2010/0224190 A1* | 9/2010 | Tilley | ................... | A62B 18/006 |
| | | | | 128/205.12 |

(Continued)

*Primary Examiner* — Margaret M Luarca
(74) *Attorney, Agent, or Firm* — Tanner IP, PLLC

(57) ABSTRACT

A modular powered air purifying respirator (PAPR) is provided including one or more of a first inlet configured to receive an ambient gas, a gas filter in fluid communication with the first inlet and configured to filter the ambient gas; a blower configured to boost at least one of a flow rate or a pressure of the ambient gas entering and/or exiting the gas filter; a second and independent inlet configured to receive a non-ambient gas; a first outlet configured to selectively provide a breathing gas to a user from the ambient gas or the non-ambient gas; and/or a controller and switching device configured to select the source of the breathing gas between the first inlet and the second inlet. Embodiments may also include a power source for the blower.

19 Claims, 19 Drawing Sheets

(56) References Cited

U.S. PATENT DOCUMENTS

| | | | |
|---|---|---|---|
| 2014/0190483 A1* | 7/2014 | Hansen | A62B 23/025 |
| | | | 128/205.12 |
| 2018/0001049 A1* | 1/2018 | Schuller | B01D 53/0415 |
| 2019/0009115 A1* | 1/2019 | Zhong | A62B 18/08 |

* cited by examiner

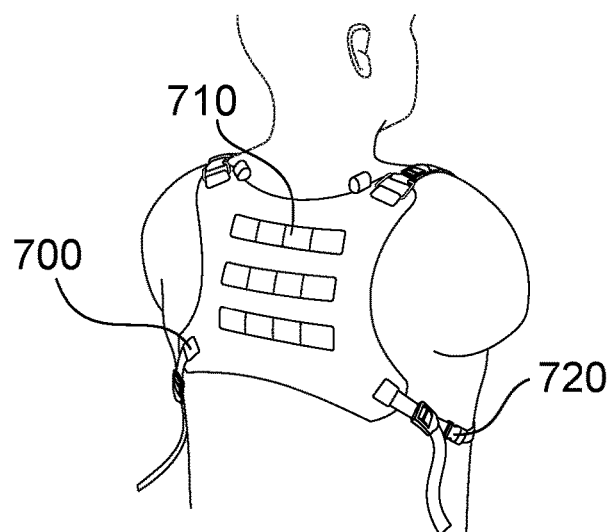
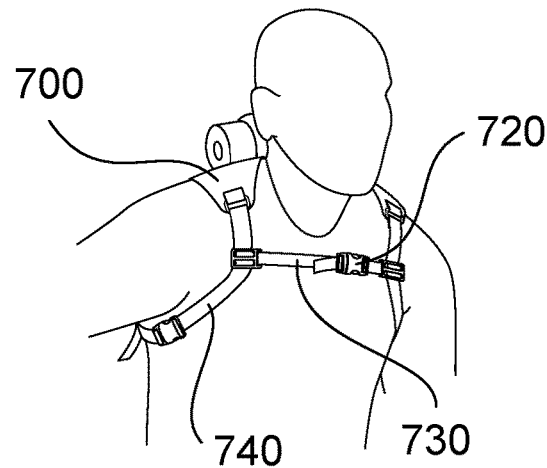
FIG. 15A  FIG. 15B
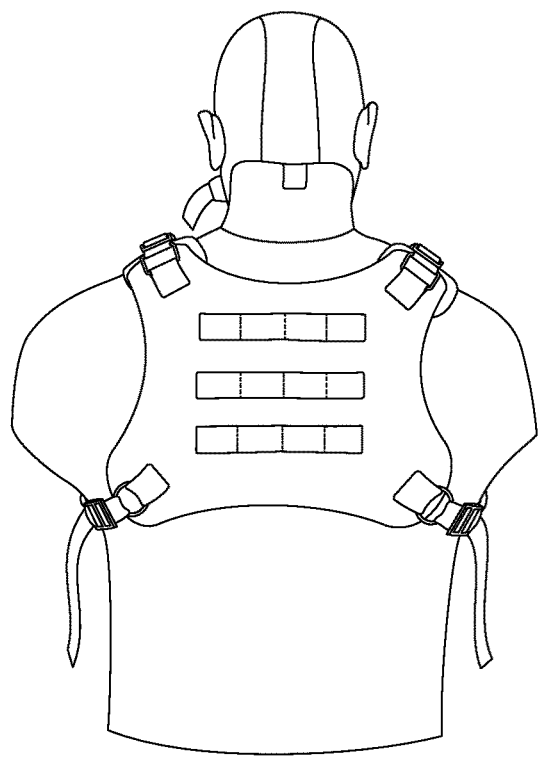
FIG. 15C  FIG. 15D

MODULAR POWERED AIR PURIFYING RESPIRATOR SYSTEM

RELATED APPLICATIONS

This application claims priority to U.S. Provisional Application No. 62/586,393 filed Nov. 15, 2017 and entitled "MODULAR POWERED AIR PURIFYING RESPIRATOR SYSTEM," the contents of which are hereby incorporated by reference in their entirety for all purposes.

BACKGROUND

The present disclosure relates generally to systems and methods for providing breathable air to users in hostile environments. In particular, various modular systems are described that may allow a user to configure and/or control the system according to changing mission parameters and environments.

There are generally two types of systems for providing breathable air to a user, those that clean ambient air, and those that provide their own gas. Among the ambient air systems, a filter or other decontamination unit may be provided, e.g. in the form of a canister, with a respirator apparatus to clean the ambient atmospheric gas and make it suitable for breathing. Such filter systems may or may not make use of auxiliary power. In powered systems, ambient atmosphere may be drawn or pushed through a suitable filter/decontamination means, or other purifying means, by a powered fan or the like, such that the contaminated ambient air is rendered breathable. The purified resultant air is fed to a headpiece of some kind, such as a tight-fitting facemask. Such systems may be referred to as a Powered Air Purifying Respirator (PAPR).

An example of a system that provides its own gas would be a Self-Contained Breathing Apparatus (SCBA) that feeds compressed (e.g. bottled) air or other combinations of breathable gas to a tight-fitting face mask, or other conduit to the mouth and/or nose, for inhaling by the user. These systems do not use the ambient atmosphere at all. Both types of breathing apparatus may be used by personnel who are subjected to an ambient atmosphere that would otherwise be harmful to the user based on contaminated, unbreathable and/or dangerous air. However, both types of systems have limitations that preclude or limit their usefulness in certain conditions, which may change during an operation, such as a rescue, firefighting, decontamination, bomb disposal, etc.

For example, one form of dangerous ambient atmosphere is air containing less than 19.5 volume percent oxygen. Such conditions are not conducive to the use of a conventional PAPR, since the conventional PAPR does not add oxygen to the ambient air. In other circumstances, even though the ambient air may have the necessary percentage of oxygen, it may contain harmful contaminants that a PAPR filter is not able to remove and/or the filter may become saturated with contaminants, and thereby become ineffective, during use. Either or both conditions may change during a given operation, e.g. based on movement through different areas of a building, fire consuming oxygen from a given area, different contaminants being present in and/or introduced to different areas, etc.

SCBA systems also possess limitations regarding the amount of compressed air that can be carried, the weight and bulk of compressed air tanks, the equipment required to recharge compressed air tanks, etc. When carrying ones' own air supply, as with an SCBA, there is a very real practical limit as to how much air can be safely carried. Contrary to operating under water with a SCUBA rig, the air bottles used by firefighters and other emergency personnel are quite heavy, must be supported entirely by the wearer, and do not have the advantage of water buoyancy partially supporting their weight. Making them larger, to be able to carry more air, increases their weight but decreases their portability. This combination of weight and working conditions severely limits the time that a firefighter, who is wearing/carrying his own air supply and tools, can effectively fight the fire.

By way of further background, the following documents describe some ways of controlling fans used in breathing apparatus. U.S. Pat. No. 9,119,979 describes an air purifying respirator blower system, comprising a fan powered by an electric motor, and an electronic control unit operable to adjust an electrical characteristic of the motor in accordance with a predetermined correlation between the speed of the fan and the applied motor electrical characteristic for a selected substantially uniform volumetric airflow from the fan. The systems include a sensor adapted to be in communication with the electronic control unit and arranged to determine one of (a) ambient air density or (b) ambient air temperature and ambient air pressure, and the electronic control unit being operable (in response to the determined ambient air density or ambient air temperature and ambient air pressure), to adjust an electrical characteristic of the motor to maintain the selected substantially uniform volumetric airflow from the fan.

U.S. Pat. No. 7,244,106 describes a control unit for a fan that detects the power consumption of the motor and the speed of the fan and compares them with a characteristic curve, stored in a memory, for the motor for a given airflow from the fan. In the event of a deviation from this characteristic curve, the control unit regulates a change in the voltage supplied to the motor to maintain a constant airflow.

U.S. Pat. App. Pub. No. 2008/0127979 describes an electronic control system for a blow filter device using a pulse width modulation (PWM) ratio as a control variable to generate a specific motor speed and a respective airflow. The PWM ratio is read from a calibration curve stored in the electronic control system.

SUMMARY

This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter.

According to first aspects of the disclosure, a powered air purifying respirator (PAPR) is provided including one or more of a first inlet configured to receive an ambient gas; a gas filter in fluid communication with the first inlet and configured to filter the ambient gas; a blower configured to boost at least one of a flow rate or a pressure of the ambient gas entering and/or exiting the gas filter; a second and independent inlet configured to receive a non-ambient gas; a first outlet configured to selectively provide a breathing gas to a user from the ambient gas or the non-ambient gas; and/or a controller and switching device configured to select the source of the breathing gas between the first inlet and the second inlet. Embodiments may also include a power source for the blower.

In embodiments, the gas filter, the blower, non-ambient gas module, and/or the power source may be configured to be joined together in an integral unit.

In embodiments, the respirator may be modular, and at least one of the gas filter(s), the blower, non-ambient gas module, and the power source may be separable and configured to be operable in various dispositions.

In embodiments, the controller and switching device may be configured to activate use of the non-ambient gas module and disable functionality of the ambient gas module.

In embodiments, activation of the non-ambient gas module may block the air path of the ambient gas module, e.g. via a selector valve such as a pinch valve, actuator valve, etc.

In embodiments, the controller may be configured to automatically select, or recommend selection of, the source of the breathing gas based on a first sensor input.

In embodiments, the first sensor input may be at least one of an oxygen level of the ambient gas, a pollutant level in the ambient gas, a filter effectiveness, or a pressure or flow rate associated with the non-ambient gas.

In embodiments, the respirator may be configured to operate via the first inlet without the second inlet being connected to a non-ambient gas source, and to operate via the second inlet without using the blower or filter.

In embodiments, the blower may include a centrifugal impeller configured to force the ambient gas through the gas filter.

In embodiments, the non-ambient gas source may be at least one of a pressurized air tank, a pressurized oxygen tank, a gas line, or other source of non-ambient gas.

Embodiments may include an indicator disposed on or about a breathing mask interface connected with the first outlet, the indicator including at least one of a visual, audio or haptic warning indicator.

In embodiments, the indicator may be integrated in a heads-up display (HUD) with a visual indicator that is visible to the user.

In embodiments, the HUD may be configured to be repositioned such that the visual indicator is no longer visible to the user.

In embodiments, the HUD may be affixed directly to the breathing tube mask interface, and the breathing tube to mask interface may include detents to allow for repositioning of the HUD.

Embodiments may include a remote control configured to control at least one of power fan speed and UI settings, and including at least one of battery and/or clog warning indicators, SCBA/PAPR setting indicator, SCBA/PAPR mode setting, or air hazard warning indicators.

Embodiments may include a control module and/or a remote control, wherein the control module and/or remote control may be configured to disable audio and/or visual alerts.

In embodiments, the remote and the HUD share a common connection point to the respirator such that both may be integrated through a single electrical connector to the respirator system.

Embodiments may include a control module with control board firmware and/or stored software configured to be updated via use of the electrical interface port(s) on the PAPR system.

Embodiments may include a control module configured to automatically adjust a motor speed of the blower based at least in part on a detected flow rate, through indirect or direct means.

According to further aspects of the disclosure, a modular breathing apparatus may be provided including one or more of a breathing mask configured to provide a breathing gas to a user; a filtering breathing module, including a gas filter and configured to provide the breathing gas from an ambient gas source to the user via the breathing mask; a contained breathing module, configured to provide the breathing gas from a non-ambient gas source to the user via the breathing mask; and/or a control module, configured to control a flow of the breathing gas at least partially between the filtering breathing module and the self-contained breathing module, or vice-versa, based on a first sensor input.

In embodiments, the filtering breathing module may be separable from the apparatus, and independently useable with the breathing mask.

In embodiments, the filtering breathing module may be a powered air purifying respirator (PAPR).

In embodiments, the PAPR may include a centrifugal impeller configured to force the ambient gas through the gas filter.

In embodiments, the control module may be configured to adjust a speed of the PAPR based at least in part on a detected flow rate through direct or indirect means.

In embodiments, the filtering breathing module may include a portable power pack configured to operate the filtering breathing module in excess of 6 hours.

In embodiments, the non-ambient gas source may be at least one of a pressurized air tank, a pressurized oxygen tank, a gas line, or other source of non-ambient gas.

In embodiments, the first sensor input may be at least one of an oxygen level of the ambient gas, a pollutant level in the ambient gas, a filter effectiveness, or a pressure or flow rate associated with the non-ambient gas.

Embodiments may include an indicator disposed on or about an interface of the breathing mask and a breathing gas inlet, the indicator including at least one of a visual, audio or haptic warning indicator.

Embodiments may include a remote control configured to control at least one of power fan speed and UI settings, and including at least one of battery and/or clog warning indicators, SCBA/PAPR setting indicator, SCBA/PAPR mode setting, or air hazard warning indicators.

According to further aspects of the disclosure, a respirator controller may be provided including one or more of a powered air purifying respirator (PAPR) control module, configured to detect at least one of a gas filter condition, an ambient gas composition, and an ambient gas pressure; a self-contained breathing apparatus (SCBA) control module, configured to detect at least one of a non-ambient gas connection, a non-ambient gas composition, a non-ambient gas pressure, and a non-ambient gas flow; and/or a source gas control module, configured to control one or more mechanisms that adjust a flow of breathing gas from a PAPR and an SCBA connected to the respirator controller.

Embodiments may include a user interface configured to control at least one of power fan speed and UI settings, and including at least one of battery and/or clog warning indicators, SCBA/PAPR setting indicator, SCBA/PAPR mode setting, or air hazard warning indicators.

In embodiments, the user interface may be integrated in a remote control.

Embodiments may include an indicator disposed on or about a breathing mask interface, the indicator including at least one of a visual, audio or haptic warning indicator.

In embodiments, the PAPR control module may be further configured to automatically adjust a motor speed of a PAPR based at least in part on a detected flow rate, directly or indirectly.

In embodiments, the source gas control module may be configured to adjust the flow of the breathing gas from the PAPR and the SCBA based at least in part on a first sensor input.

In embodiments, the first sensor input may be at least one of an oxygen level of an ambient gas provided via the PAPR, a pollutant level in the ambient gas, a filter effectiveness of the PAPR, or a pressure or flow rate associated with a non-ambient gas provided via the SCBA.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 15A-15D depict a modular harness and breathing apparatus according to certain aspects of the present disclosure;

Figure 1:
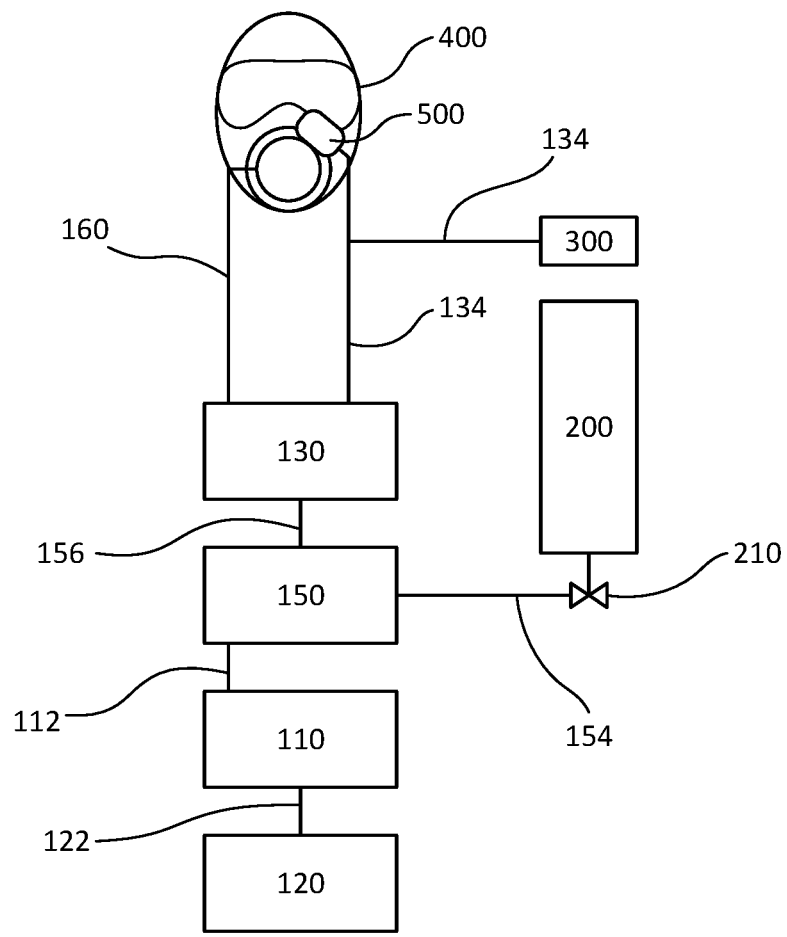
FIG. 1 is a schematic diagram of a modular breathing apparatus according to certain aspects of the present disclosure.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

It is understood that the invention is not limited to the particular methodology, protocols, etc., described herein, as these may vary as the skilled artisan will recognize. It is also to be understood that the terminology used herein is used for describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a filter" is a reference to one or more filters and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

Referring now to the drawing, there is shown in FIG. 1 a schematic diagram of a modular breathing apparatus, and associated parts, according to certain aspects of the present disclosure. As shown in FIG. 1, a modular breathing apparatus may include a PAPR unit 110 that draws ambient air through filter unit 120 via filter connection 122. Filtered ambient air may be provided from the PAPR unit 110 to control/power unit 130 via PAPR connection 112.

As also shown in FIG. 1, an SCBA unit 150 may also be included with the modular breathing apparatus, and may receive non-ambient gas (in this case compressed air) from a high-pressure air tank 200 via regulator 210 and air supply hose 154. The SCBA unit 150 may provide non-ambient gas to the control/power unit 130 via SCBA connection 156. The air tank 200 may be assembled into a conventional harness or other load bearing equipment. The non-ambient gas provided by air tank 200 may be routed through the modular breathing apparatus such that it does not pass through the filter media in the filter 120, and proceeds instead through the SCBA unit 150, control/power unit 130 and breathable air hose 160 into the mask 400. One or more gas pressure regulators 210 may be required for use with compressed gas in order to let the bottle pressure down to a pressure that is manageable by the modular breathing apparatus and/or user. As discussed further below, an exemplary SCBA unit 150 may include a second stage regulator configured to reduce the pressure of the gas provided via line 154 to a breathable pressure.

As also discussed further below, filtered ambient air provided via the PAPR connection 112, and non-ambient gas provided via the air hose 154, may be selectively provided by the SCBA unit 150 to control/power unit 130 via SCBA connection 156, and to a mask 400 via breathable air hose 160.

A remote control 300 and/or HUD 500 may be operatively connected to the control/power unit 130 via a remote control line 134. In some embodiments, these connections may be separated. However, in cases where certain features are shared between the HUD 500 and remote control 300, e.g. warning and/or mode indicators, etc., it can be beneficial to combine the control line for the HUD 500 and remote control 300.

Figure 2A:
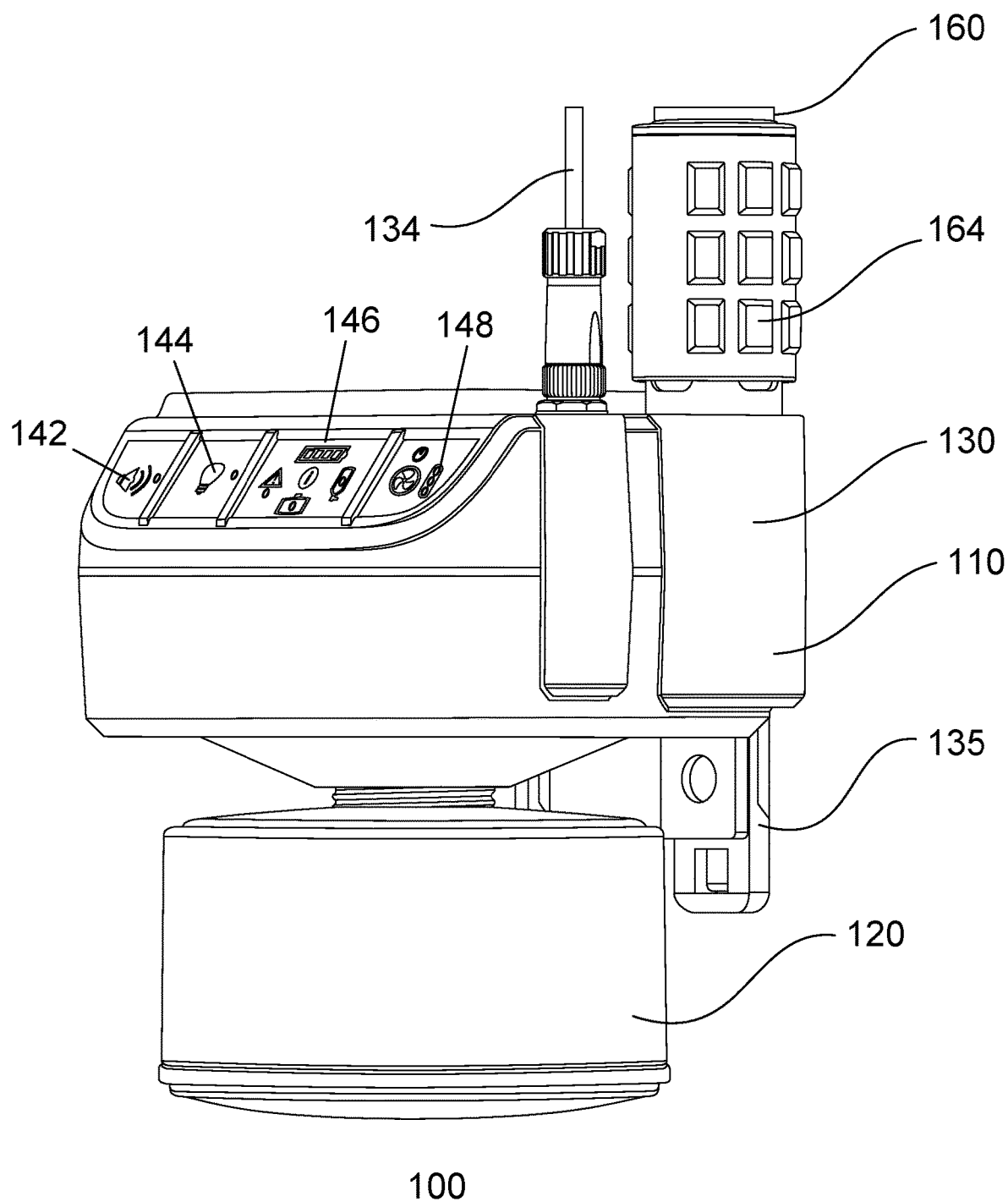
FIGS. 2A and 2B depict a modular breathing apparatus and details of a PAPR unit according to certain aspects of the present disclosure.

FIG. 2A depicts a modular breathing apparatus including some of the components mentioned above. As shown in FIG. 2A, modular breathing apparatus 100 includes a filter unit 120 removably connected to PAPR unit 110. PAPR unit 110 is connected to control/power unit 130 to form an integral unit. As discussed further below, additional components, such as a SCBA unit 150 may also be integrated into the modular breathing apparatus 100. However, the unit shown in FIG. 2 is configured to operate independently as an integral PAPR unit, unless and until a SCBA unit 150 is added to the unit.

The filter unit 120 may take various forms, such as those known in the art, and/or as described in U.S. application Ser. No. 15/624,670, entitled "FILTER FOR RESPIRATOR MASK OR OTHER FILTERING APPLICATIONS," the contents of which are hereby incorporated by reference in their entirety. Subject to the class of canisters fitted and the time spent in the contaminated area, the canisters may provide breathable air in a chemically, biologically or nuclear contaminated environment.

PAPR unit 110 includes a mechanism, such as a blower, impeller, fan or other mechanism, to draw ambient air through filter unit 120 to remove contaminants from the ambient air. In embodiments, the mechanism may include a centrifugal impeller configured to force the ambient gas through the filter unit 120. PAPR unit 110 is configured for use in atmospheres with solid or liquid contaminants, gases, and/or vapors to provide a useable and safe supply of breathable air where the atmosphere contains adequate oxygen to support life. PAPR unit 110 may be powered by a battery held by control/power unit 130, and may include electrical connections for communicating electrical power and/or control signals between the PAPR unit 110 and control/power unit 130.

Control/power unit 130 includes a control panel with several controls and indicators, such as sound control, indicator and/or alerts 142, light control, indicator and/or alerts 144, SCBA control, indicator and/or alerts 146, PAPR blower control, indicator and/or alerts 148, etc. Such features allow a user (or assistant) to control various aspects of the modular breathing apparatus, and provide the user/assistant with information regarding operation and/or status of the modular breathing apparatus. Similar control/power units may include controls for power fan speed and UI settings, battery and/or clog warning indicators, SCBA/PAPR setting indicator, and/or SCBA/PAPR mode setting. Such features may be replicated in whole or in part, for example, on a remote control 300 and/or HUD 500. Specific control functionality and alerts are discussed further below, e.g. with respect to FIGS. 5 and 7.

In embodiments, the control/power unit 130 may be configured to generate (and selectively enable and/or disable) audio, visual and/or haptic alerts for a variety of conditions related to an operating environment, functions and/or operational conditions of an attached PAPR and/or SCBA. For example, the control/power unit 130 may include, or be connected to, one or more sensors that detect the presence and/or concentrations of oxygen, other gasses, and/or contaminants in the ambient air, and/or pressure or other conditions of a non-ambient gas source, and may be configured to provide alerts to a user based on these measurements compared to predetermined thresholds.

One example would be to provide the user with an alert when the oxygen level in the ambient air falls below 19.5 volume percent, the control/power unit 130 may generate an audio, visual and/or haptic alert, e.g. for the user to switch to an SCBA if available. Similarly, the control/power unit 130 may generate automated control signals based on similar criteria, e.g. to switch a breathable gas source from ambient air via the PAPR to compressed air via the SCBA. Similar alerts and/or automated controls may be based on the detection of contaminants in the ambient air that the PAPR is not capable of adequately removing or diminishing, and/or detection of contaminants in the air scrubbed by the filter 120, which may indicate performance degradation of the filter.

Control/power unit 130 may include features that allow for monitoring and/or control of various functions described herein. This may be accomplished using one or more circuit boards, microprocessors, various wired and/or wireless interfaces, etc. The control/power unit 130 may include control board firmware and/or stored software configured to be updated via use of one or more electrical interface port(s) on the modular breathing apparatus 100. Such updates may advantageously include, for example, updates to filter material and/or filter performance information, etc.

Figure 5:
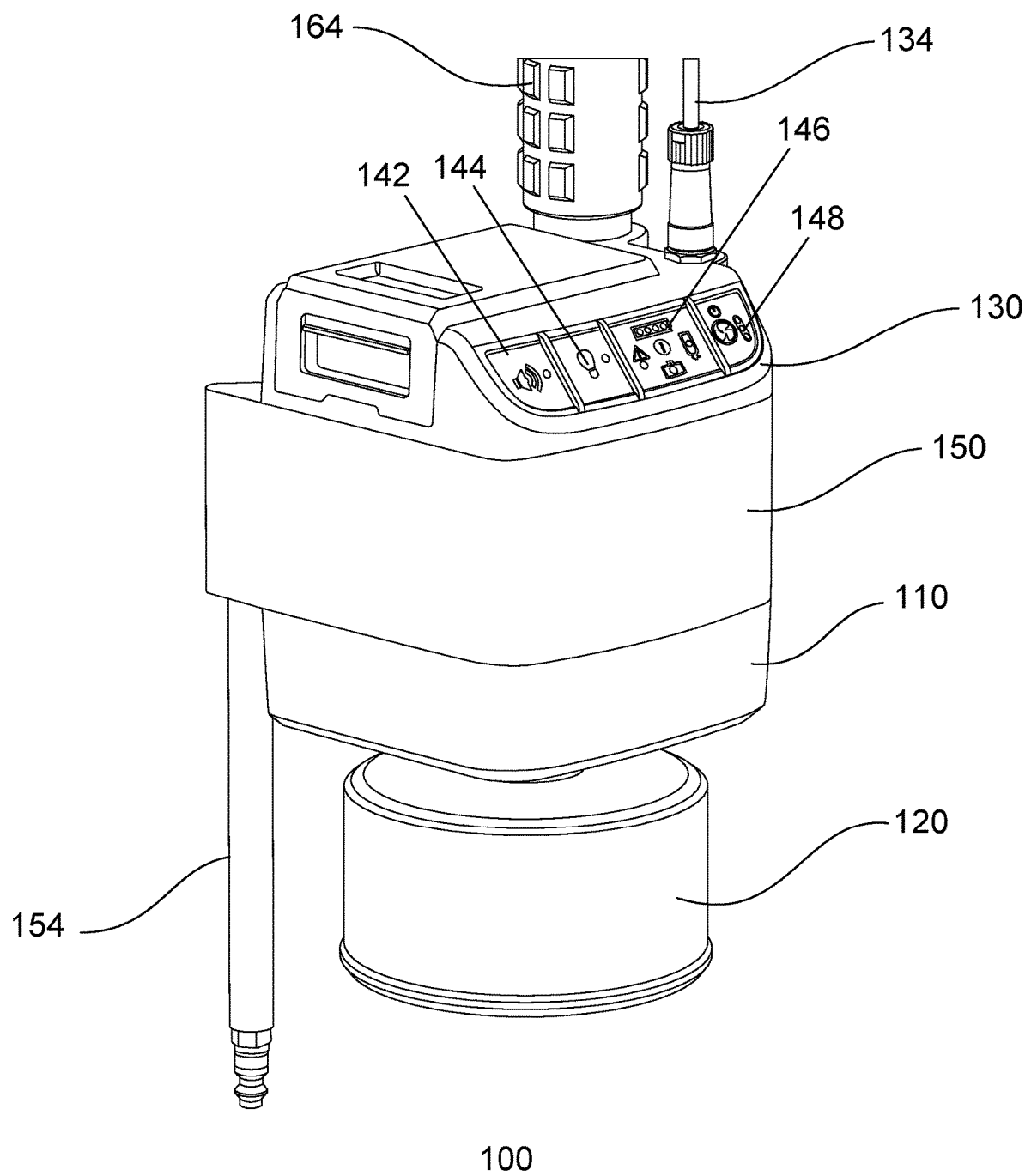
FIG. 5 depicts another modular breathing apparatus, including a SCBA unit, according to certain aspects of the present disclosure.
Figure 6:
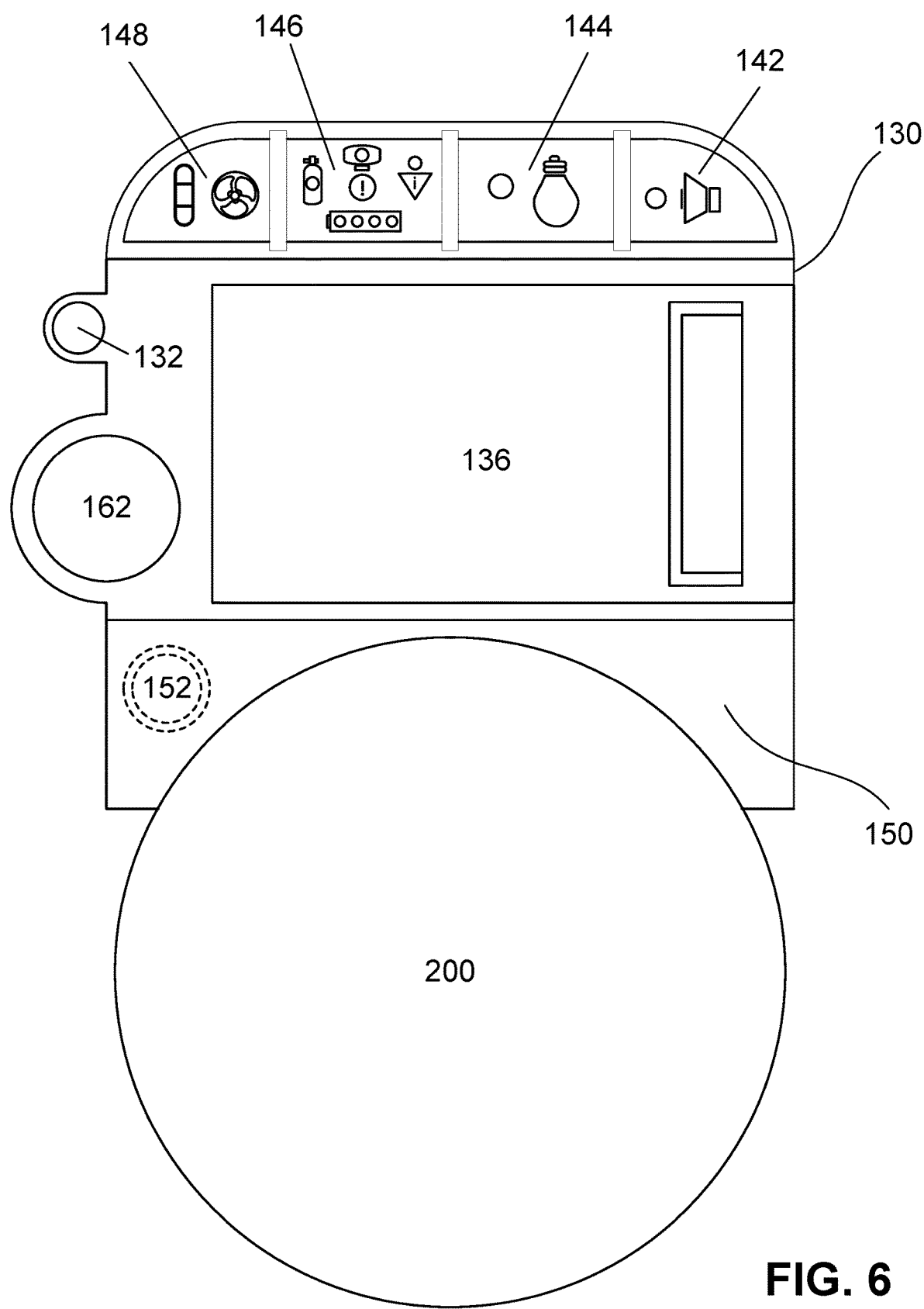
FIG. 6 is a top-down view of the modular breathing apparatus shown in FIG. 5.
Figure 7A:
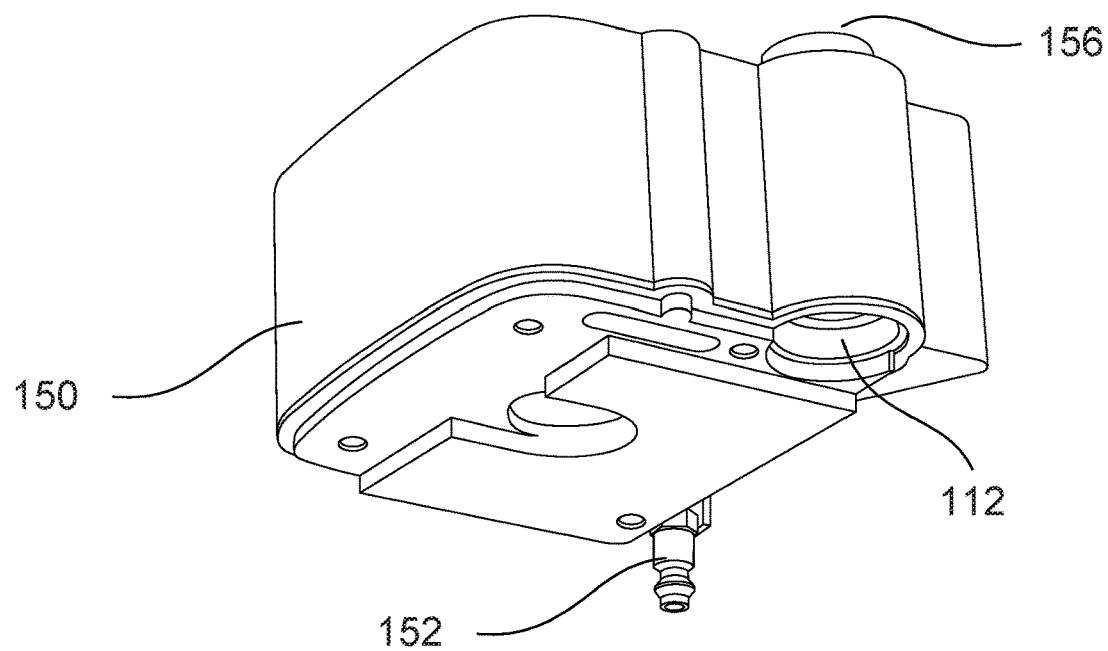
FIGS. 7A-7D show additional details of an SCBA unit and exemplary valves that may be incorporated in a modular breathing apparatus according to certain aspects of the present disclosure.

Control/power unit 130 also includes a hose fitting that cooperates with a fitting 164 of breathable air hose 160. In some examples, a valve may be provided in the control/power unit 130 that controls the source of breathable air provided to breathable air hose 160 via hose fitting 162 (e.g. as shown in FIG. 6). In some embodiments, the control/power unit 130 may include an interface configured to communicate with SCBA unit 150 (e.g. as shown in FIGS. 5 and 7A) and to provide status information on the SCBA unit 150 and/or control gas valves or other functions of the SCBA unit 150. The fitting 164 may take various forms, and may include quick connect/disconnect features such as push-to-connect fittings, Qwik-Lok™ fittings, slide lock/unlock fittings, quarter turn fitting, threaded connectors, etc.

Control/power unit 130 may include various features to automatically adjust a motor speed of the blower based on, for example, a detected flow rate, which may be determined through indirect or direct means. For example, changes in flow rate may be indirectly detected based on changes in current provided to the blower motor.

In some cases, a predetermined volumetric airflow of filtered air may be delivered to the user of a PAPR for breathing and to give a certain level of protection from the ingress of particles or gases into their breathing zone. Currently available systems often provide a volumetric airflow that is much higher than is needed, rather than risk a situation where too little air is provided. A higher airflow usually means that the battery life between charges is reduced or that larger batteries are required, as more power is consumed to provide the higher airflow. Filter life is also reduced by providing a higher airflow as excess contaminated air is moved through the filters leading to unnecessary filtering and premature clogging or saturation of the filters. As filters are consumable and require replacement many times over the lifetime of the PAPR, this can lead to higher operating costs. A further problem is that in many PAPRs a low airflow alarm is required, alerting the user to the fact that the airflow has fallen below a predetermined level. Where an inaccurate airflow measuring or control system is used, the alarm level is often set at an artificially high level to ensure that the user is always safe. This in turn can lead to filters being changed too frequently or the user leaving the workplace unnecessarily. Hence it can be seen that an accurate control of the airflow, at a particular volumetric airflow, can lead to improved battery lives between charges or the use of smaller and lighter batteries, improved filter life and reduction of premature low airflow alarms. According to aspects of the invention, the flow rate may be controlled/maintained by the control/power unit 130 via adjustments to the motor speed of the blower to achieve the desired volumetric airflow. In some examples, the control/power unit 130 may also adjust the desired volumetric airflow.

Figure 8:
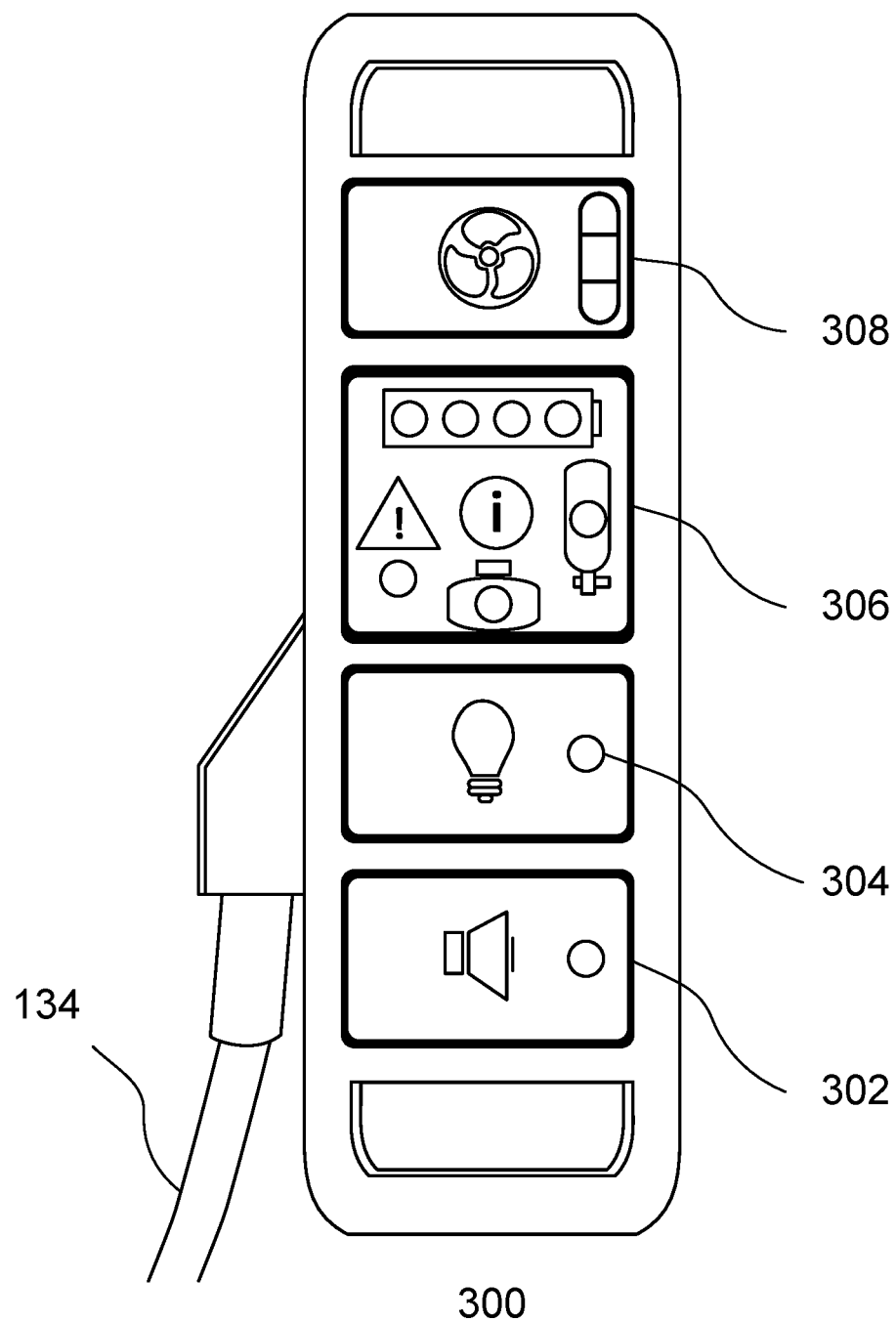
FIG. 8 depicts a remote control for a modular breathing apparatus according to certain aspects of the present disclosure.
Figure 9:
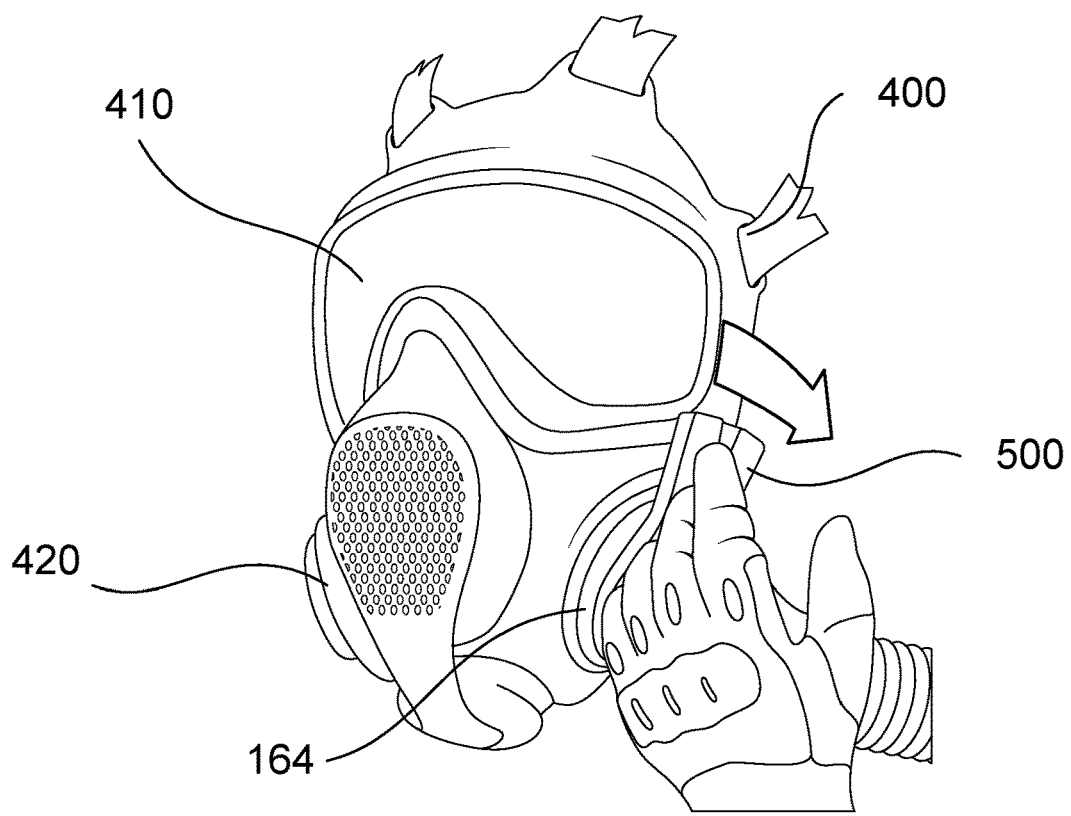
FIG. 9 shows a facemask and repositionable HUD according to certain aspects of the present disclosure.

Remote control line 134 may lead from control/power unit 130 to remote control 300 (e.g. shown in FIG. 8) and/or HUD (e.g. HUD 500 shown in FIG. 9). Thus, the remote control 300 and the HUD may share a common connection point to the modular breathing apparatus such that both may be integrated through a single electrical connector to the modular breathing apparatus.

Control/power unit 130 and/or PAPR unit 110 may include attachment mechanisms 135, which may be configured to connect the modular breathing apparatus 100 to standard MOLLE gear, webbing, belts, complimentary fasteners, other mounting hardware (such as a shaped portion described below and shown in FIG. 6), etc. In some examples, the attachment mechanisms 135 may be removable, e.g. to facilitate adding an SCBA unit between the control/power unit 130 and the PAPR unit 110, mounting a modular breathing apparatus 100 as shown in FIGS. 5 and 6 to a compressed gas cylinder, etc.

Figure 2B:
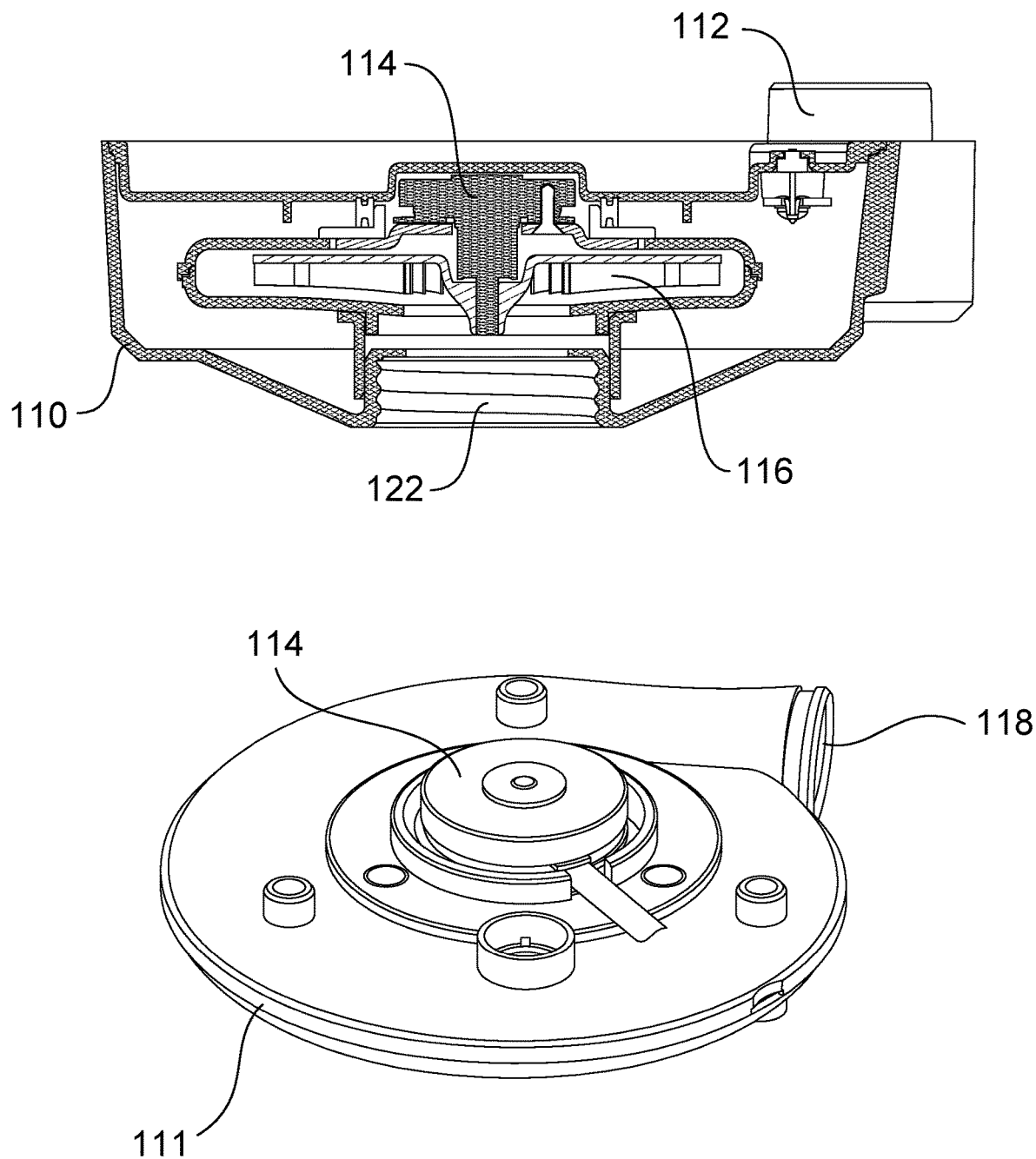

FIG. 2B shows additional details of the PAPR unit 110. As shown in FIG. 2B, the PAPR unit 110 may include a blower 111 with centrifugal impeller 116, powered by blower motor 114 (e.g. a brushless electric motor), in fluid communication with the filter connection 122, blower outlet 118 and the PAPR connection 112. In embodiments, the centrifugal impeller 116 may have a low-profile with individual blade thicknesses of, for example, less than 1.0 cm, less than 0.75 cm, or about 0.5 cm.

Figure 3:
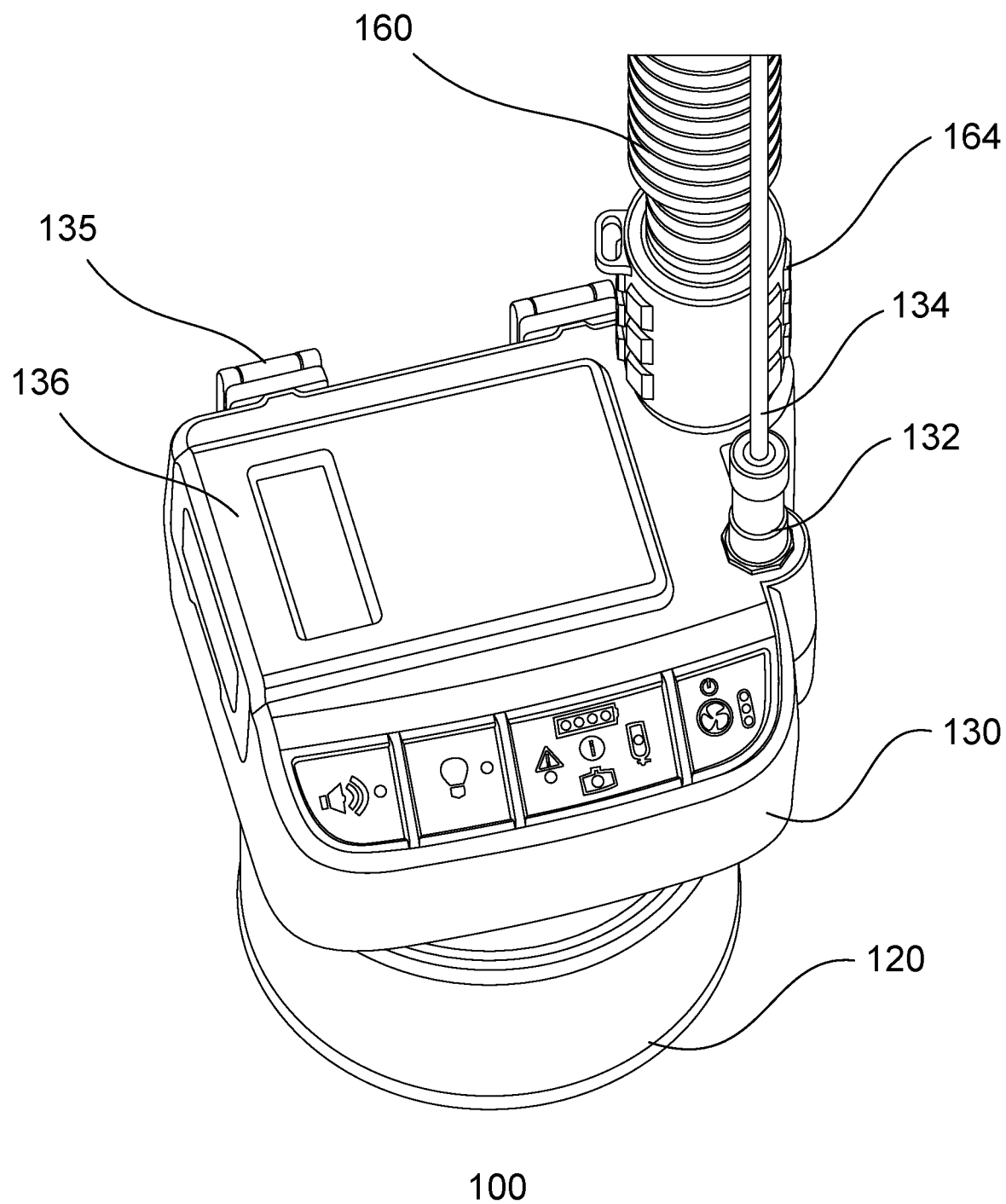
FIG. 3 is a top-down view of the modular breathing apparatus shown in FIG. 2.

FIG. 3 is a top-down view of the modular breathing apparatus shown in FIG. 2A, showing additional details of the control panel on the control/power unit 130, as well as a battery 136 that is held by and powers the control/power unit 130. As can also be seen in FIG. 3, the remote control line 134 is connected to the control/power unit 130 via a remote control/HUD fitting 132, which may include electrical connections that allow the control/power unit 130 to communicate with (e.g. send alerts and status information to, and receive commands from) a remote control and/or HUD connected to remote control line 134. Although depicted as a wired connection, similar communications may be achieved via wireless techniques known in the art.

Figure 4:
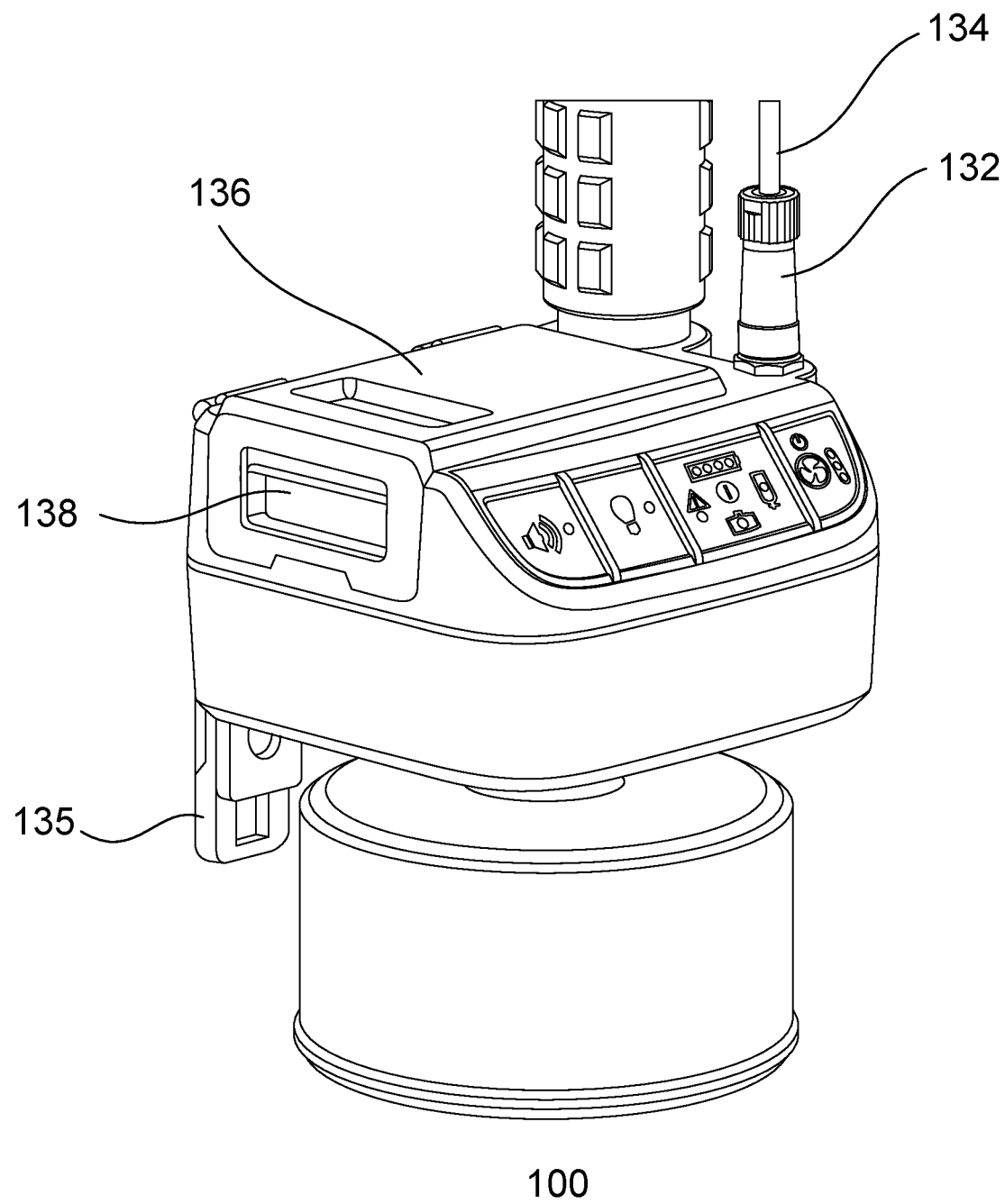
FIG. 4 is another view of the modular breathing apparatus shown in FIG. 2.

FIG. 4 is another view of the modular breathing apparatus shown in FIG. 2, including battery 136 and battery release mechanism 138. The battery release mechanism 138 may be integrated with the battery 136 and may allow for very rapid battery changes for the modular breathing apparatus 100, without tools or precise handling. This may be particularly beneficial, for example, when users are wearing CBRN protective gear with mask and heavy gloves that may interfere with their ability to see and manipulate small objects. In embodiments, the portion of the control/power unit 130 housing that accommodates the battery 136 may be sealed such that, when the battery 136 is removed, the PAPR system maintains its integrity from contaminants in the atmosphere, thereby preventing such airborne contaminants from entering the system as the battery is being changed.

FIG. 5 depicts another modular breathing apparatus, including a SCBA unit, according to certain aspects of the present disclosure. As shown in FIG. 5, the modular breathing apparatus 100 includes the filter unit 120 removably connected to the PAPR unit 110. However, in this instance, the PAPR unit 110 is also connected to a SCBA unit 150 that fits between the control/power unit 130 and the PAPR unit 110 to form an integral unit. The integral unit shown in FIG. 5 is thereby configured to operate as a combined PAPR and SCBA unit.

In the example shown in FIG. 5, the ambient air from PAPR unit 110 is allowed to pass through the SCBA unit 150 via a passage that links the PAPR connection 112 between the PAPR unit 110 and control/power unit 130. The SCBA unit 150 also provides air to the control/power unit 130 via a separate passage. The two passages may be linked in the SCBA unit 150 (or the control/power unit 130) via a valve, as discussed further below.

The SCBA unit 150 may receive air from a compressed air tank or other non-ambient gas source via air supply hose 154. In some examples, SCBA unit 150 may include a regulator that reduces a pressure of the air or other gas supplied via air supply hose 154. SCBA unit 150 may also include electrical connections with the PAPR unit 110 and/or control/power unit 130 that provide various functions described herein. For example, the SCBA unit 150 may communicate power and/or command signals from the control/power unit 130 to the PAPR unit 110, the SCBA unit 150 may receive command signals from and/or provide information to control/power unit 130, etc.

Additional details of the combined modular breathing apparatus 100 of FIG. 5 are shown in the top-down view of FIG. 6. As shown in FIG. 6, the control/power unit 130 sits atop and shares a substantially similar layout with SCBA unit 150 and PAPR unit 110. However, SCBA unit 150 may include an extended portion that is not covered by the control/power unit 130, allowing, for example, an air supply hose fitting 152, and a shaped portion that conforms to a compressed air/gas tank 200. In embodiments, the air supply hose fitting 152 may be configured to attach to a pressurized air tank, a pressurized oxygen tank, a gas line, or other source of non-ambient gas.

The shaped portion of SCBA unit 150 facilitates easy mounting of the modular breathing apparatus 100 to a compressed gas cylinder when the SCBA unit 150 is added to the stack, while also allowing for the modular breathing apparatus 100 to maintain a lower profile, and be secured to a relatively flat surface, when the SCBA unit 150 is not included (as in FIG. 2). In some embodiments, the shaped portion, or other gas cylinder mounting interface, of SCBA unit 150 may be removable from the SCBA unit 150. Release mechanisms for the shaped portion or other gas cylinder mounting interface may include mechanical fasteners, snap fit mechanisms, locking slide mechanisms, removable straps, etc. This may facilitate a number of features, including interchangeable mounting interfaces, e.g. with different diameter and/or multiple shapes, rapidly removing the combined modular breathing apparatus from a compressed gas cylinder, selectively providing a flat back surface of the combined modular breathing apparatus, etc.

As also shown in FIG. 6, the top of control/power unit 130 includes accessible breathable air hose fitting 162, remote control/HUD fitting 132, removable battery 136, sound control, indicator and/or alerts 142, light control, indicator and/or alerts 144, SCBA control, indicator and/or alerts 146, PAPR blower control, indicator and/or alerts 148, etc. The specific controls and indicators can take many forms, but preferably include controls and indicators for both PAPR and SCBA units, thereby allowing the control/power unit 130 to function as a combined controller regardless of the specific configuration being used. By way of example, sound control, indicator and/or alerts 142 may allow the user to enable/disable sound such as alerts and command feedback, e.g. when the tactical situation requires silence. Light control/indicator 144 may allow the user to enable/disable visual indicators, e.g. when the tactical situation requires light discipline. SCBA controls and alerts 146 may allow the user to monitor pressure in a compressed air tank, activate/deactivate an SCBA unit, etc. In the example shown in FIG. 6, there is also a battery indicator for the battery 136 included in the alerts 146. PAPR blower control and alerts 148 may include power fan speed controls (e.g. including a plurality of calibrated settings such as high, medium, and low, typically ranging from 85 LPM to 130+ LPM, or 165 liters/minute, 116 liters/minute, and 85 liters/minute measured at or about the breathing tube), clog or other warning indicators, activate/deactivate PAPR unit controls, etc. As mentioned previously, such features may be replicated in whole or in part, for example, on a remote control 300 and/or HUD 500.

Control/power unit 130 may include a PAPR control module (e.g. in the form of specific hardware and/or software instructions), configured to detect a gas filter condition, an ambient gas composition, an ambient gas pressure, or other relevant conditions. The PAPR control module may be configured to provide various alerts or automated commands based on such information, such as providing a user with status and/or warnings regarding the gas filter condition, providing a user with status and/or warnings, or switching to non-ambient gas, based on the ambient gas composition, adjusting blower speed based on the ambient gas pressure, etc.

Control/power unit 130 may also include a SCBA control module, configured to detect a non-ambient gas connection, a non-ambient gas composition, a non-ambient gas pressure, a non-ambient gas flow, or other relevant conditions. The SCBA control module may be configured to provide various alerts or automated commands based on such information, such as enabling operation of the SCBA unit 150 based on detection of the non-ambient gas connection, providing a user with status and/or warnings regarding the non-ambient gas pressure and/or non-ambient gas flow, etc.

Control/power unit 130 may also include a source gas control module, configured to control one or more mechanisms, such as actuators, valves, etc., that adjust a flow of breathing gas from PAPR unit 110 and SCBA unit 150 when connected to the modular breathing apparatus 100. For example, source gas control module may control a valve or other mechanism(s) that allow the modular breathing apparatus 100 to operate via the PAPR unit 110 without the air supply hose fitting 152 being connected to a non-ambient gas source, and/or to operate via the SCBA unit 150 without using the blower or filter of PAPR unit 110. The gas control module may also allow the user, or the modular breathing apparatus 100 itself, to switch between available sources of breathable air, e.g. between ambient air provided via the PAPR unit 110 and non-ambient gas provided by SCBA unit 150, and vice versa. Activation of the SCBA unit 150 may block the air path of the PAPR unit 110, e.g. via a selector valve such as a pinch valve, actuator valve, etc.

Figure 7B:
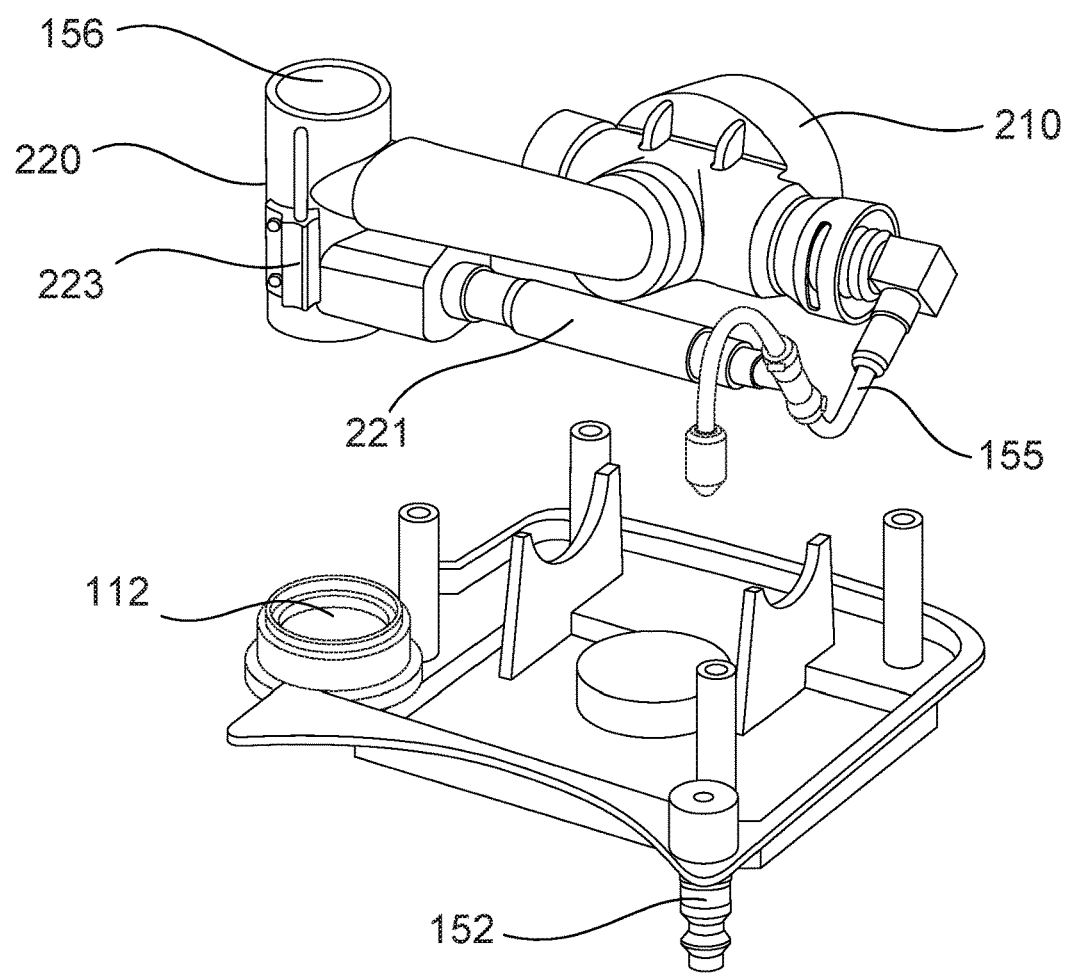

FIGS. 7A and 7B show additional details of an exemplary SCBA unit 150. As shown in FIG. 7A, the SCBA unit 150 includes air supply hose fitting 152, SCBA connection 156, and a receptacle for PAPR connection 112.

FIG. 7B shows internal components of the SCBA unit 150, including a valve 220 in fluid communication with PAPR connection 112, non-ambient gas source (via regulator 210), and SCBA connection 156. Non-ambient gas enters the SCBA unit 150 via air supply hose fitting 152 and proceeds through HP air line 155, pressure communication line 221, and regulator 210, which reduces the pressure of the non-ambient gas before it enters valve 220. Valve 220 may also include a switch 223 that is configured to detect and/or change the state of the valve 220.

Figure 7C:
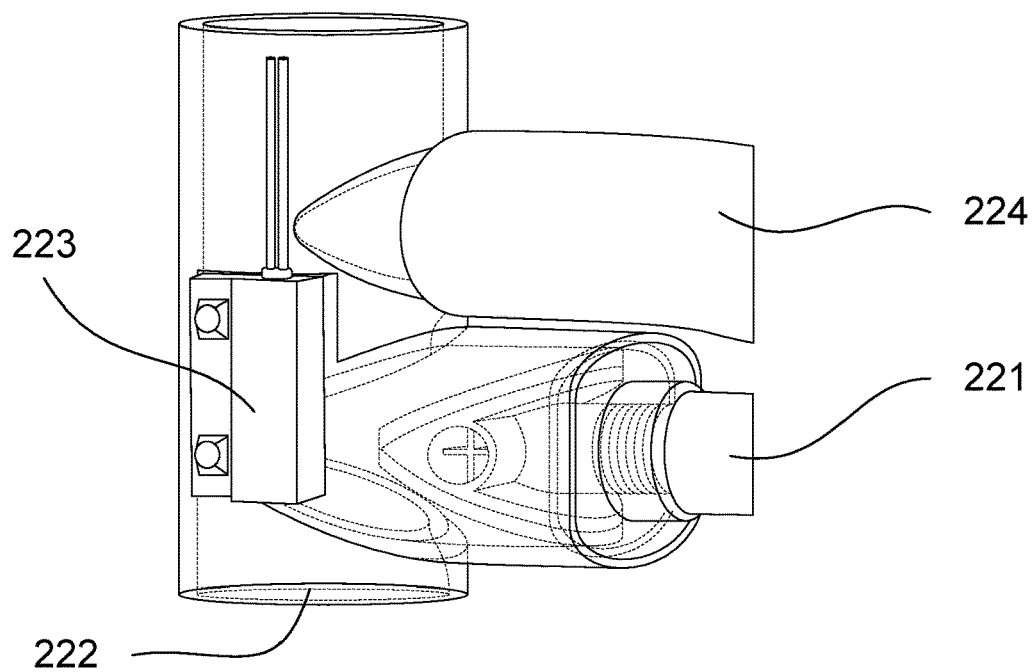

FIG. 7C shows internal details of the valve 220 including a double-sided spear valve that is actuated by pressure communication line 221 to shut the PAPR connection 222, and allow the valve to receive gas from the non-ambient gas inlet 224. When the valve 220 is shut, the switch 223 may send and/or allow a signal that is used to turn off the PAPR unit 110. Similarly, when the valve 220 is opened, the switch 223 may send and/or allow a signal that is used to turn on the PAPR unit 110. It should be appreciated that the pressure communication line 221 may be manually activated, e.g. by a user opening an HP valve on air tank 200, or other valve on air supply hose 154, etc., or pressure communication line 221 may be automatically activated, e.g. by the control/power unit 130 actuating a valve on high pressure line 155, air supply hose 154, etc.

Figure 7D:
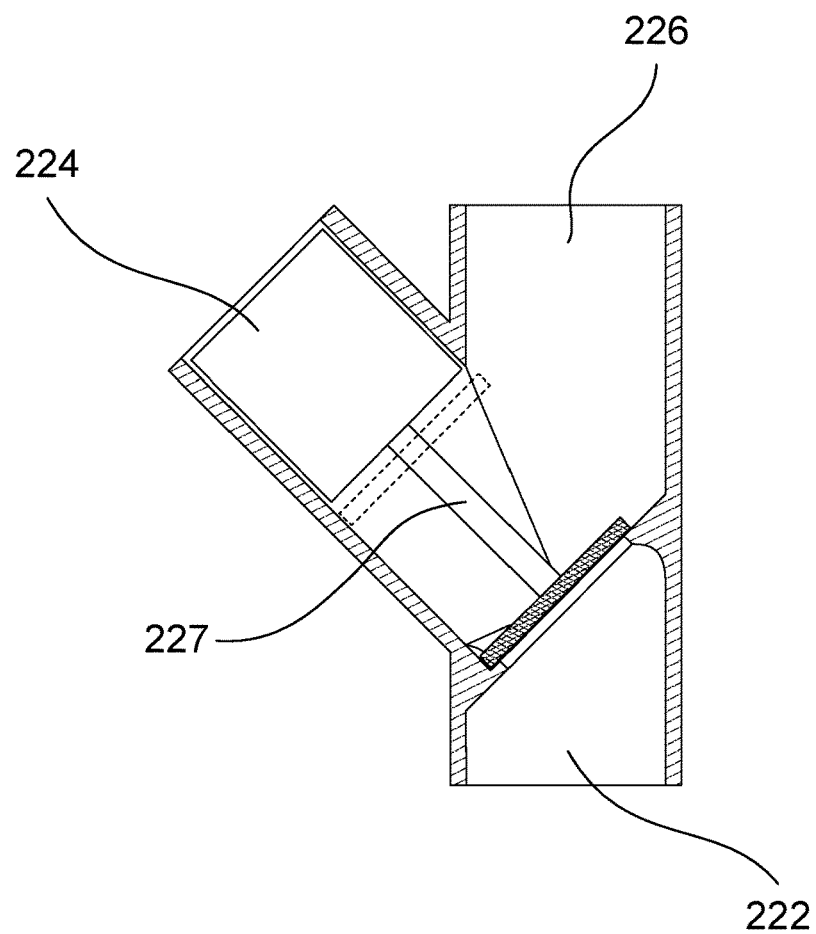

FIG. 7D shows another example of a valve that may be incorporated in the SCBA unit 150 or the control/power unit 130, and may be controlled via the source gas control module. This valve includes a movable stem 227, with discs on opposite ends that seat in an ambient air inlet 222 and a non-ambient gas inlet 224, respectively. One way of controlling this valve is to regulate the pressure on the inlets, e.g. applying a positive pressure to the non-ambient gas inlet 224 opens the valve to the non-ambient gas and closes the ambient air inlet 222. Likewise, reducing the pressure to the non-ambient gas inlet 224, and increasing the pressure to the ambient air inlet 222, such as by turning on the PAPR blower, can open the ambient air inlet 222 and close the non-ambient gas inlet 224. The valve 220 (or inlets) may also be directly controlled, e.g. via electro-mechanical actuators, etc. The valve 220 allows a selected gas to exit via the breathable air outlet 226, which may be in fluid communication with an outlet fitting such as the hose fitting 162.

Under manual control, the PAPR unit 110 may be turned on, the regulator 210 may be closed, and the valve may be disposed such that the intake 224 is closed and the intake 222 is open, due to the pressure of air from the blower in PAPR unit 110. When the wearer determines that a switch to non-ambient gas is required, e.g. because the atmosphere is in danger of becoming unbreathable or contaminated by a challenge greater than the filter being worn is designed to handle, the wearer may open the regulator on SCBA tank 200, and the resultant air pressure will open intake 224 and close intake 222 shutting off air from the PAPR. The wearer will now be breathing only bottled air. The wearer may switch off the power supply to the PAPR unit 110 and/or the PAPR blower.

Under semi-automatic control, the PAPR unit 110 may also be turned on, with the regulator 210 closed, and the valve 220 disposed such that the intake 224 is closed and the intake 222 is open, again due to the pressure of air from the blower in PAPR unit 110. In this case, when the user determines that a switch to non-ambient gas is required, e.g. based on a warning indicator of an ambient contaminant that the filter is not capable of scrubbing, a contaminant level in the air exiting the filter, a filter clog condition, etc., the wearer may activate the SCBA unit 150 via remote control 300, SCBA control 306. The control/power unit may then open a regulator on SCBA tank 200, regulator 210, and/or other internal valve/regulator, and the resultant air pressure opens intake 224, and closes intake 222. The wearer may switch off the PAPR unit 110 via PAPR control 308.

Under automatic control, the PAPR unit 110 may also be turned on, with the SCBA tank 200 regulator open and the regulator 210 closed. The valve is then disposed such that the intake 224 is closed, and the intake 222 is open due to the pressure of air from the blower in PAPR unit 110. In this case, when the control/power unit 130 determines that a switch to non-ambient gas is required, e.g. based on detection of an ambient contaminant that the filter is not capable of scrubbing, a contaminant level in the air exiting the filter, a filter clog condition, etc., the control/power unit 130 may activate the SCBA unit 150, including opening the regulator 210 (or other internal valve/regulator). The resultant air pressure opens intake 224, and closes intake 222. The control/power unit 130 may then switch off the PAPR unit 110, e.g. based on a signal from switch 223.

Similar processes may also be used to switch from the SCBA unit to the PAPR unit. For example, when the user determines that a switch to ambient air is required or otherwise desirable (e.g. to preserve non-ambient gas pressure), the wearer may activate the PAPR unit 110 via PAPR control 308 (causing the control/power unit to switch on the PAPR blower), and deactivate SCBA unit 150 via SCBA control 306 (causing the control/power unit to close the regulator 210 or other internal valve/regulator), and the resultant change in air pressures closes intake 224, and opens intake 222.

Likewise, when the user runs out of compressed gas, the system may automatically transition to ambient air. For example, if the control/power unit senses a loss of pressure from the non-ambient gas source, it may automatically switch on the PAPR blower, and the resultant change in air pressures closes intake 224, and opens intake 222. As another example, the system may also mechanically deactivate valve 221 with the loss of pressure from SCBA tank 200, which will cause switch 223 to signal the PAPR unit 130 to turn the PAPR system back on.

The foregoing represent some ways in which the system may be configured to support various modes of source switching, and are described in the context of using pressure-responsive valves such as 220. However, it should be appreciated that many other valve activation means are possible, including valves that can be held closed or opened electrically, electromagnetically, or electro-mechanically.

The user may switch between different modes using controls on the control/power unit 130, e.g. manual mode when all activation/deactivation is performed by the user; semi-automatic, when the user provides commands to the control/power unit to switch between sources; and automatic, when the control/power unit switches between sources without user input. As discussed previously, the control/power unit 130 may provide various warning indicators and associated suggestions to the user when a dangerous or other condition exists that warrants a change in air source. Such suggestions may include logic that recognizes past actions and/or current conditions in generating suggestions. For example, if a change to non-ambient gas is initiated based on a drop in ambient atmosphere oxygen levels, an alert may be provided to the user (or automatic source switching engaged) when an acceptable oxygen level is later detected. Similarly, if ambient air is engaged due to a drop in non-ambient gas pressure, despite otherwise dangerous conditions, an alert may be provided to the user (or automatic source switching engaged) when an acceptable pressure level is later detected, e.g. if a new compressed air bottle is attached to the system.

In some examples, a more elaborate valve may be used that can mix the gas sources at a desired level. This may be used, for example, to extend the operational duration of a compressed air or oxygen tank being used to supplement low-oxygen ambient air; to limit, without totally blocking, exposure to contaminants in the ambient atmosphere, which may not be completely removed by the PAPR; etc.

In embodiments, the source gas control module may be configured to adjust the flow of the breathing gas from the PAPR and the SCBA via the valve 220 based at least in part on a first sensor input, such as an oxygen level of an ambient gas provided via the PAPR, a pollutant level in the ambient gas, a filter effectiveness of the PAPR, a pressure or flow rate associated with a non-ambient gas provided via the SCBA, etc.

Filter 120 may also include a filter cover that is operable to seal the intake of the filter from the ambient atmosphere. The filter cover can be configured to manually seal the filter intake by user activation, and/or to automatically seal the filter based on a positive pressure in the filter, a positive pressure at the non-ambient gas intake (e.g. via a fluid communication channel), or by other automated means such as solenoids, etc. In some examples, the control/power unit may be configured to automatically open the filter cover when the PAPR unit 110 is active (e.g. when the blower is on), and/or to automatically close the filter cover when the PAPR unit 110 is inactive (e.g. when the blower is off).

FIG. 8 depicts a remote control 300 for a modular breathing apparatus according to certain aspects of the present disclosure. As shown in FIG. 8, as discussed elsewhere herein, the remote control 300 may be attached to, and communicate with, the control/power unit 130 via remote control line 134.

The remote control 300 may include a sound control/indicator 302, light control/indicator 304, SCBA controls and alerts 306, and PAPR blower control and alerts 308. The specific controls and indicators can take many forms, but preferably include controls and indicators for both PAPR and SCBA units, thereby allowing the remote control 300 to function as a combined remote controller regardless of the specific configuration being used. By way of example, sound control/indicator 302 may allow the user to enable/disable sound such as alerts and command feedback, e.g. when the tactical situation requires silence. Light control/indicator 304 may allow the user to enable/disable visual indicators, e.g. when the tactical situation requires light discipline. SCBA controls and alerts 306 may allow the user to monitor pressure in a compressed air tank, receive a warning of an airborne contaminant, receive a filter clog warning, activate/ deactivate an SCBA unit, etc. In the example shown in FIG. 8, there is also a battery indicator for the battery 136 included in the alerts 306. PAPR blower control and alerts 308 may include power fan speed controls or other warning indicators, activate/deactivate PAPR unit controls, etc. As mentioned previously, such features may replicate in whole or in part controls/alerts included on the control/power unit 130, and may allow the user easier access to those controls/alerts, e.g. when the modular breathing apparatus 100 is worn on the user's back. Remote control 300 may also include a haptic feedback mechanism, e.g. vibrating motor or other device, that allows the user to feel when alerts are generated and/or commands are executed.

FIG. 9 shows a breathing mask 400 and repositionable HUD 500 according to certain aspects of the present disclosure. As shown in FIG. 9, the mask 400 may include a lens 410, and breathing outlet 420. Breathing outlet 420 may typically include a one-way valve that allows the contents of the mask 400 to vent from the mask 400 to ambient atmosphere. This valve is designed so that it only opens when the gaseous contents of the mask 400 are at a pressure greater than ambient.

It is noted that, although this example, and others described herein, generally relate to open-circuit SCBA systems (i.e. those in which the user's exhaled gasses are released to the ambient atmosphere), it should be appreciated that the described invention is not necessarily limited to such systems, and may find applicability in other systems such as closed or semi-closed systems in which all or part of the user's exhaled gasses are recycled within the system. For example, instead of an open-circuit compressed air SCBA, canisters of compressed oxygen may be used for a SCBA rebreather, that scrubs or otherwise vents carbon dioxide out of the breathing loop. Although pure oxygen is generally disfavored for certain applications, such as firefighting, the extended duration and/or reduction in weight can be advantageous in other situations, e.g. where fire is not an expected hazard. By way of further example, exemplary systems may switch between open circuit PAPR operations and closed or semi-closed SCBA operations. In embodiments, a semi-closed SCBA mode may be used, for example, in which the PAPR maintains positive pressure, and regulator 210 acts as a demand valve for respiration. This can be advantageous in extending the use of the pressurized gas, e.g. in low-oxygen situations where the pressurized gas supplements the ambient gas provided by the PAPR and/or when a positive mask pressure is desired to avoid contaminants entering the mask.

Returning to FIG. 9, HUD 500 may be attached to an end of breathable air hose 160 proximate to the hose fitting 164. The HUD 500 may include one or more visual, audio and/or haptic indicators, and may be configured to change positions, e.g. between a visible position that can be seen by the user though lens 410, a reduced-visibility position that is less visible by the user through lens 410, and/or a non-visible position that cannot be seen by the user through lens 410. In some examples, the HUD 500 may be configured to sense when the positioning is changed, and to change a feedback mode based on the positioning of the HUD. For example, visual indicators may be disabled and/or audio or haptic feedback (provided by the HUD or other feedback device) enabled when the HUD 500 is in a non-visible position, etc.

Figure 10:
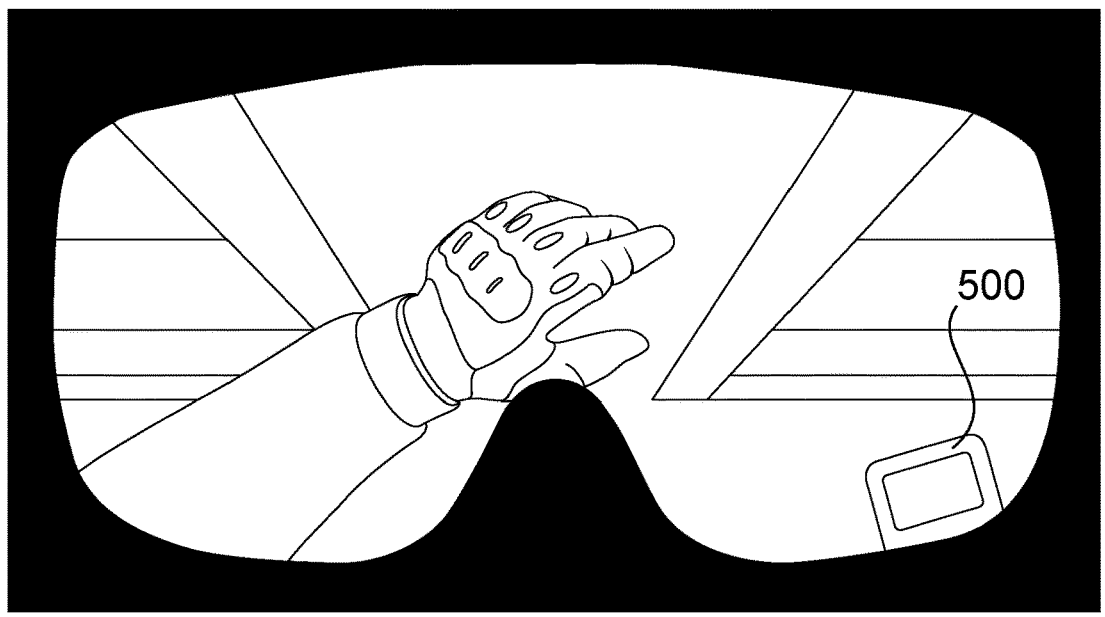
FIG. 10 is a user view through a facemask with a HUD in the field of view according to certain aspects of the present disclosure.

FIG. 10 is a user view through lens 410 with HUD 500 in the field of view according to certain aspects of the present disclosure. As shown in FIG. 10, the HUD 500 includes a visual indicator, in this case a red warning light, that is visible to the user (i.e. is in the user's field of view looking through the lens 410). The visual indicator can take many forms, and may include, for example, different color lights, text, etc., and may also be programmable by the user or automatically adaptable. In some instances, the user may be able to select the information provided on the HUD 500, e.g. by cycling through different information available to the system, such as ambient oxygen level, compressed gas pressure, volumetric flow, contaminate levels, battery level, timers, etc. In some examples, the HUD 500 may automatically change displayed warnings and/or information based on information processed by the control/power unit 110, such as changing displays based on activation of the PAPR unit 110 or SCBA unit 150, changing warning indicators based on activation of the PAPR unit 110 or SCBA unit 150, changing warning indicators based on detected ambient air, filter, volumetric flow or other conditions, etc. In some examples, a similar visual indicator on HUD 500 may be activated based on different types of information and/or warnings, and can be used, for example, to easily alert the user that there is a problem that requires further investigation, such as by checking more detailed status information on the remote control 300 or another device.

Figure 11:
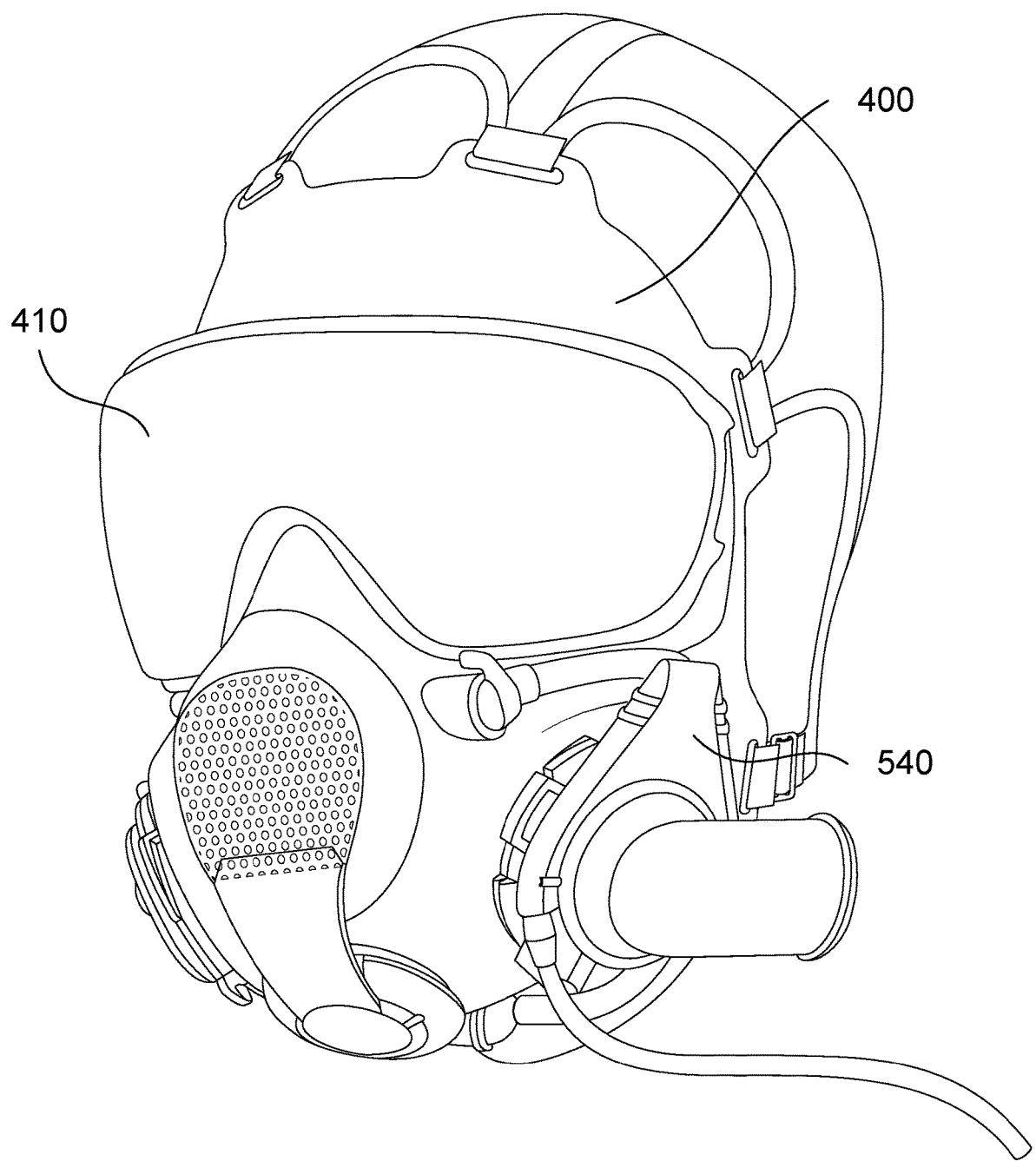
FIG. 11 is another depiction of a facemask and repositionable HUD according to certain aspects of the present disclosure.

FIG. 11 is another depiction of a mask 400 and repositionable HUD 540 according to certain aspects of the present disclosure. As shown in FIG. 11, the HUD 540 may be rotated out of the user's line of sight. Such positioning may fully or partially obstruct the HUD 540 from the user's view out of lens 410. The removal of the HUD 540 from the user's view may be desirable, for example, when the user is engaged in tasks requiring their full field of view and/or attention, or when the warnings or other information provided by the HUD are unnecessary.

Figure 12:
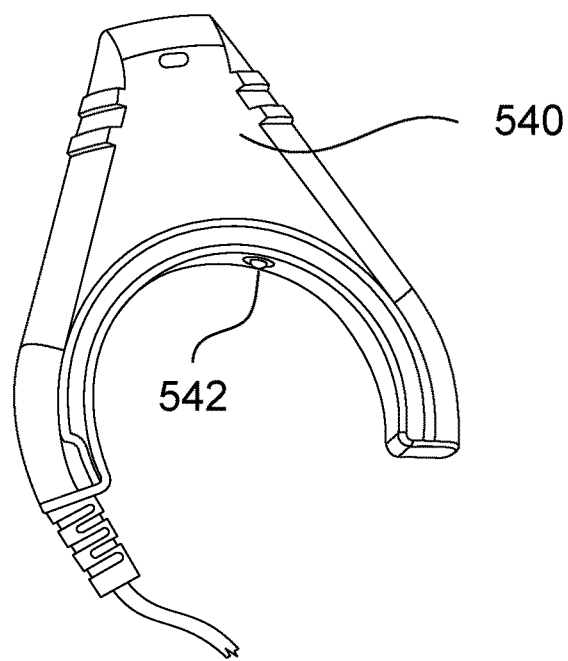
FIG. 12 shows details of a repositionable HUD that is configured to cooperate with the fitting shown in FIG. 13.

FIG. 12 is another depiction of a HUD 540 according to certain aspects of the present disclosure. As shown in FIG. 12, the HUD 540 may be attached and detached from a hose and/or hose fitting via a c-clip. The HUD 540 may also include one or more teeth or spring loaded mechanism 542 configured to engage with detents in the hose or fitting, thereby holding the HUD 540 in a given, rotatable position. The HUD 540 may include a visual indicator that is visible only from the user's point of view, e.g. using a directional emitter on the side of the HUD 540 facing the user. Such configurations may be beneficial in reducing the visual signature of the HUD 540. In other embodiments, a visual indicator may be provided that is visible by the user and by an observer, e.g. using omnidirectional emitter. Such configurations may be beneficial in allowing a teammate to rapidly assess breathing apparatus problems with an injured, distracted or potentially unconscious user.

Figure 13:
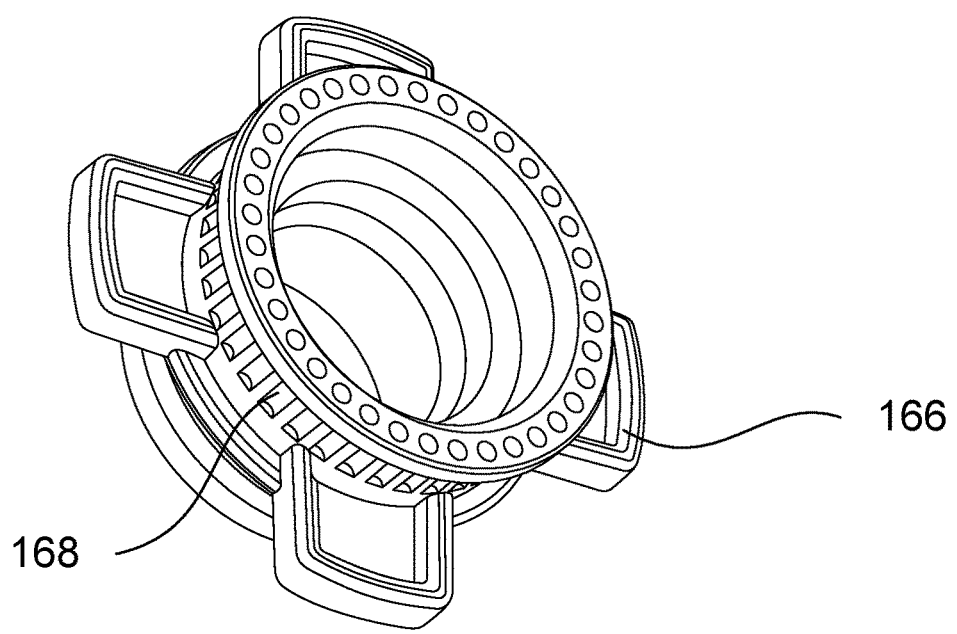
FIG. 13 shows details of a mask fitting according to certain aspects of the present disclosure.

FIG. 13 is a depiction of a mask fitting 166 according to certain aspects of the present disclosure. The mask fitting 166 may be disposed at the end of a breathable air hose, such as 160, or it may be fixedly or removably attached to a protective mask. In embodiments, the HUD 540 may be affixed directly to the mask fitting 166, and the mask fitting 166 may include detents 168 to allow for repositioning of the HUD 540 around the mask fitting 166 via engagement with teeth or spring-loaded mechanism 542.

Figure 14:
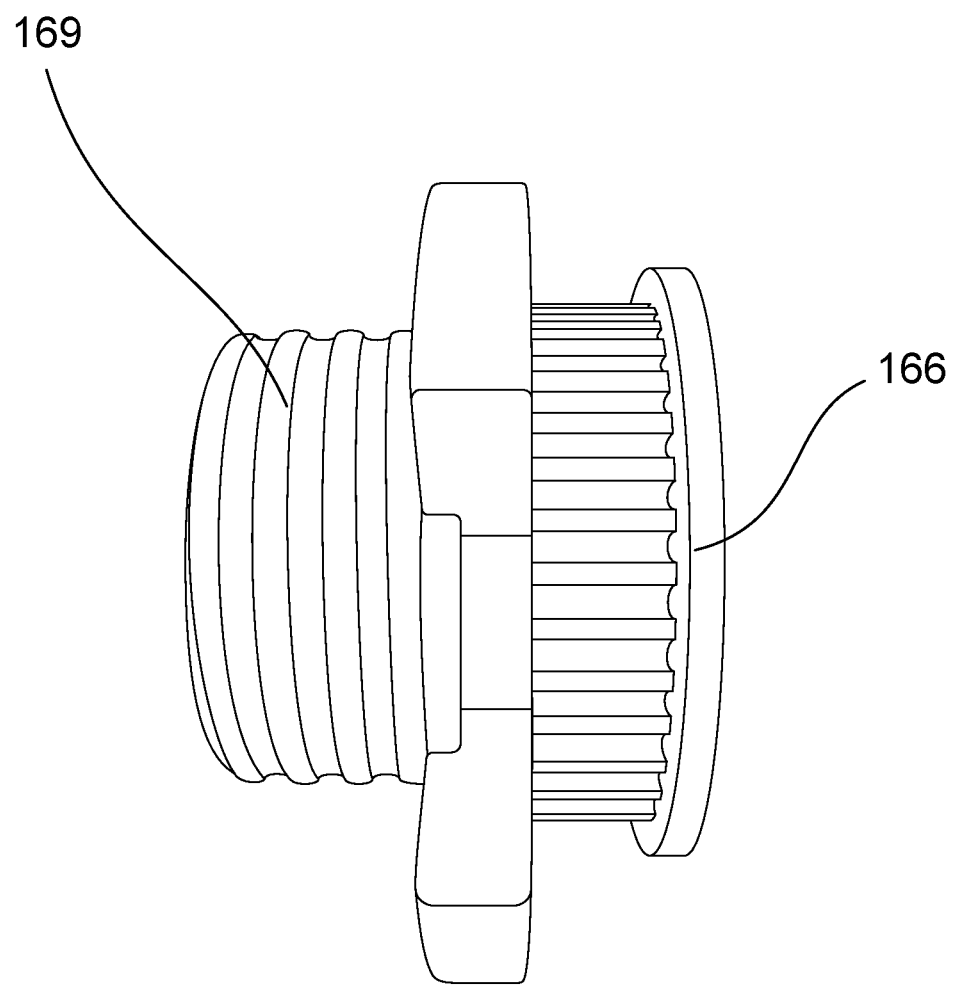
FIG. 14 shows additional details of the fitting shown in FIG. 13.

FIG. 14 shows additional details of the fitting 166 shown in FIG. 13. As shown in FIG. 14, the fitting 166 may include threads or ridges 169 for securing the fitting 166 into a cooperating fitting of mask 400.

FIGS. 15A-15D depict a modular harness for use with a breathing apparatus according to certain aspects of the present disclosure. As shown in FIGS. 15A and 15B, the modular harness 700 may include attachment points 710 configured to receive corresponding connectors of a breathing apparatus, preferably a PAPR unit without the SCBA unit. The attachment points can be, for example, a standardized webbing attachment system (such as MOLLE), mechanical connectors, or other attachment means known in the art. Strap connectors 720 may also be provided that allow release and/or removal of straps such as chest strap 730 and/or shoulder straps 740.

FIG. 15C depicts an exemplary modular harness as worn by user, and FIG. 15D shows the modular harness being worn with a breathing apparatus, hose and mask.

Figure 16A:
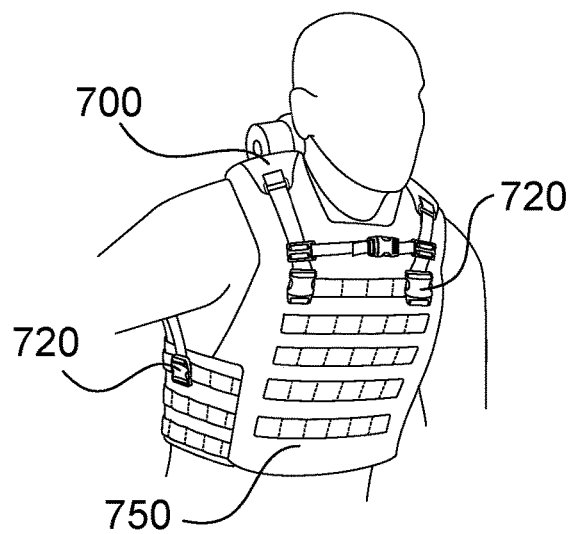
FIGS. 16A-16D depict the modular harness and breathing apparatus from FIGS. 15A-15D attached to a body armor carrier according to certain aspects of the present disclosure.

FIGS. 16A-16D depict modular harness 700 attached to other load bearing equipment, in this case body armor carrier 750. As shown in FIG. 16A, the modular harness may be attached to body armor carrier 750 (or other load bearing equipment) via the strap connectors 720. This may be achieved, for example, by removing and/or releasing the chest strap 730 and/or shoulder straps 740 and joining the strap connectors to complimentary connectors on the body armor carrier 750, by weaving portions of the chest strap 730 and/or shoulder straps 740 through buckles on the body armor carrier 750, or other mechanical means.

Figure 16B:
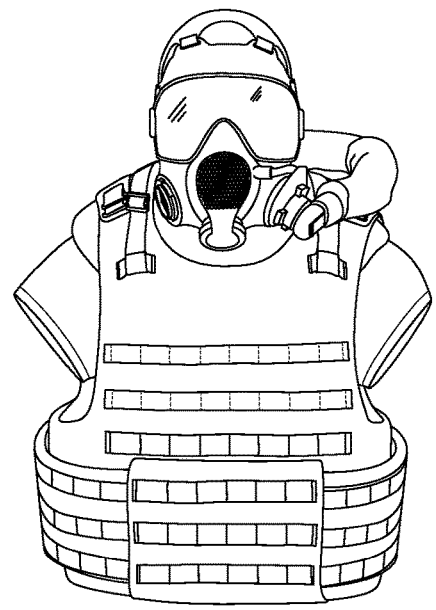
Figure 16C:
Figure 16D:
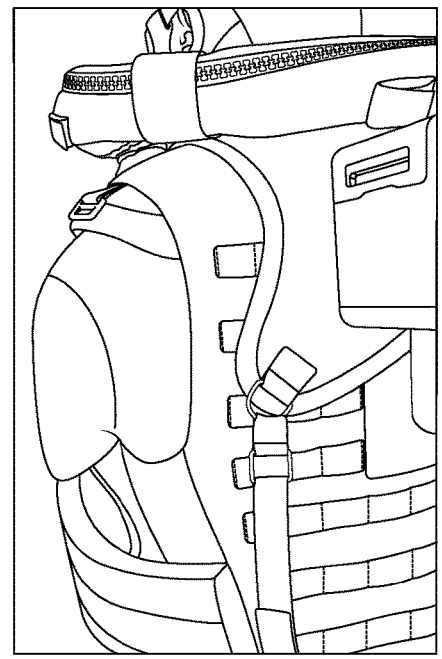

FIG. 16B-16D show additional details of an exemplary modular harness being worn with a breathing apparatus, hose and mask. In this configuration, the breathing apparatus may be for the most part inaccessible by the user, and the controls and/or indicators provided on the remote control 300 and/or HUD 500 can be especially helpful to the user wearing such apparatus.

Figure 17:
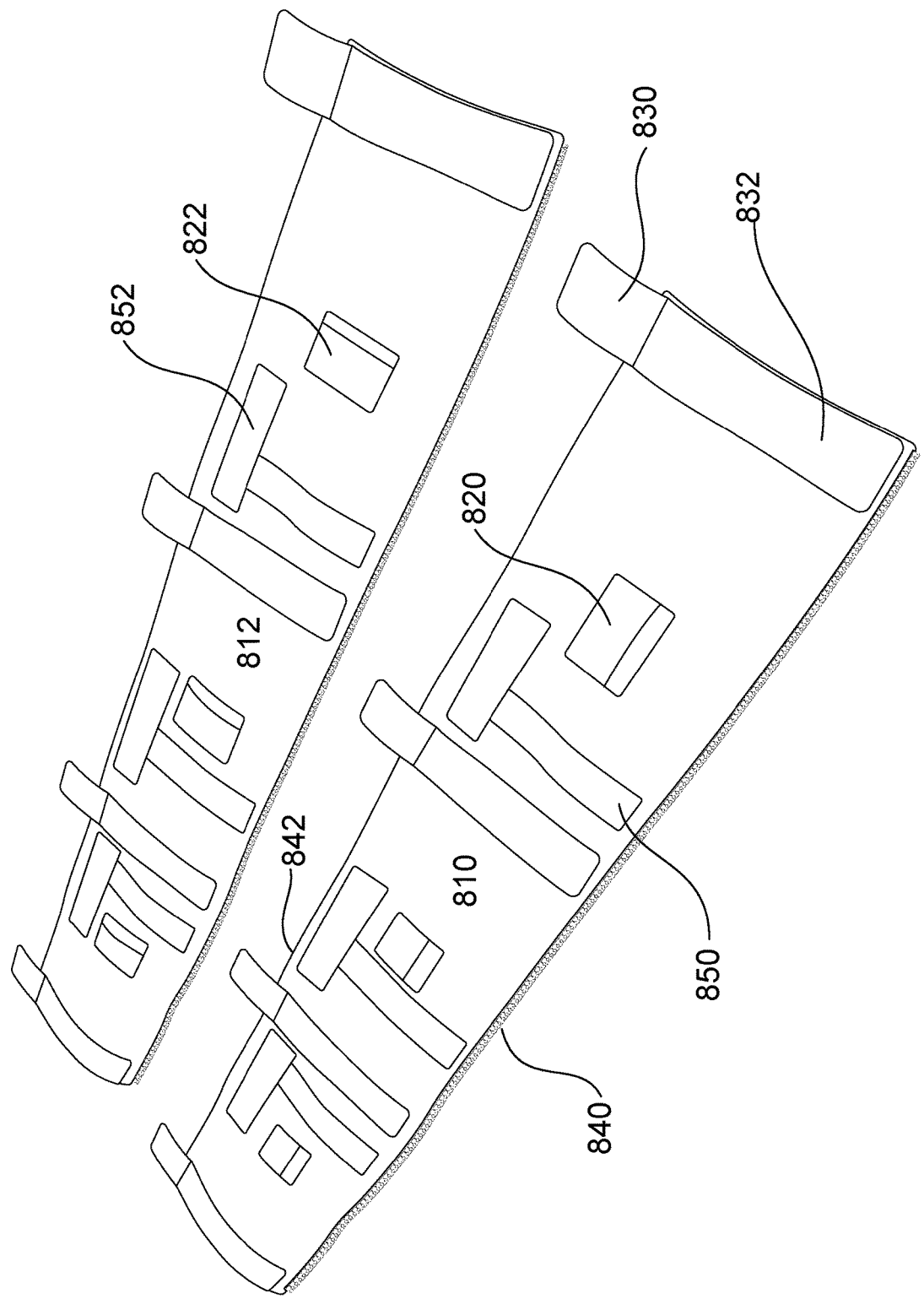
FIG. 17 show hose wraps according to certain aspects of the present disclosure.

FIG. 17 shows two hose wraps 810, 820 according to certain aspects of the present disclosure. The hose wraps 810, 820 shown in FIG. 17 may be used to wrap one or more of the remote control line 134, breathable air hose 160, water tube, or other cords routed from the user's back to front. This can be beneficial when lines having different origins and/or functions need to be routed to a similar (or different) endpoint. For example, a HUD control line, a breathable air hose and a drinking tube may all need to be routed proximate to a protective mask. These may be routed from one or more locations on the user's back, through the hose wrap, to the desired location, together and without interfering with each other. The hose wrap may be made from more traditional materials such as Nylon, cotton, or other natural or synthetic fibers. The hose wrap may also be constructed from flame resistant or chemical resistant materials to allow for use in environments where the user may be exposed to direct flame.

The hose wrap may include Velcro® or other closures that allow it to be opened and closed rapidly (e.g. binding wraps 830, 832), a secondary closure (e.g. zippers 840, 842), and a plurality of openings (e.g. 820, 822) through which lines, hoses and/or cords can be routed through at different positions along the hose wrap. In some embodiments, the openings in the hose wrap may be oriented along the length of the hose wrap (as shown by openings 820 on hose wrap 810), or transverse to the length of the hose wrap (as shown by openings 822 on hose wrap 812), e.g. depending on the desired routing direction. The hose wraps 810, 820 may further include securing straps (e.g. 850, 852) that are configured to secure the hose wrap to load bearing equipment, such as harness 700, body armor carrier 750, etc.

Figure 18:
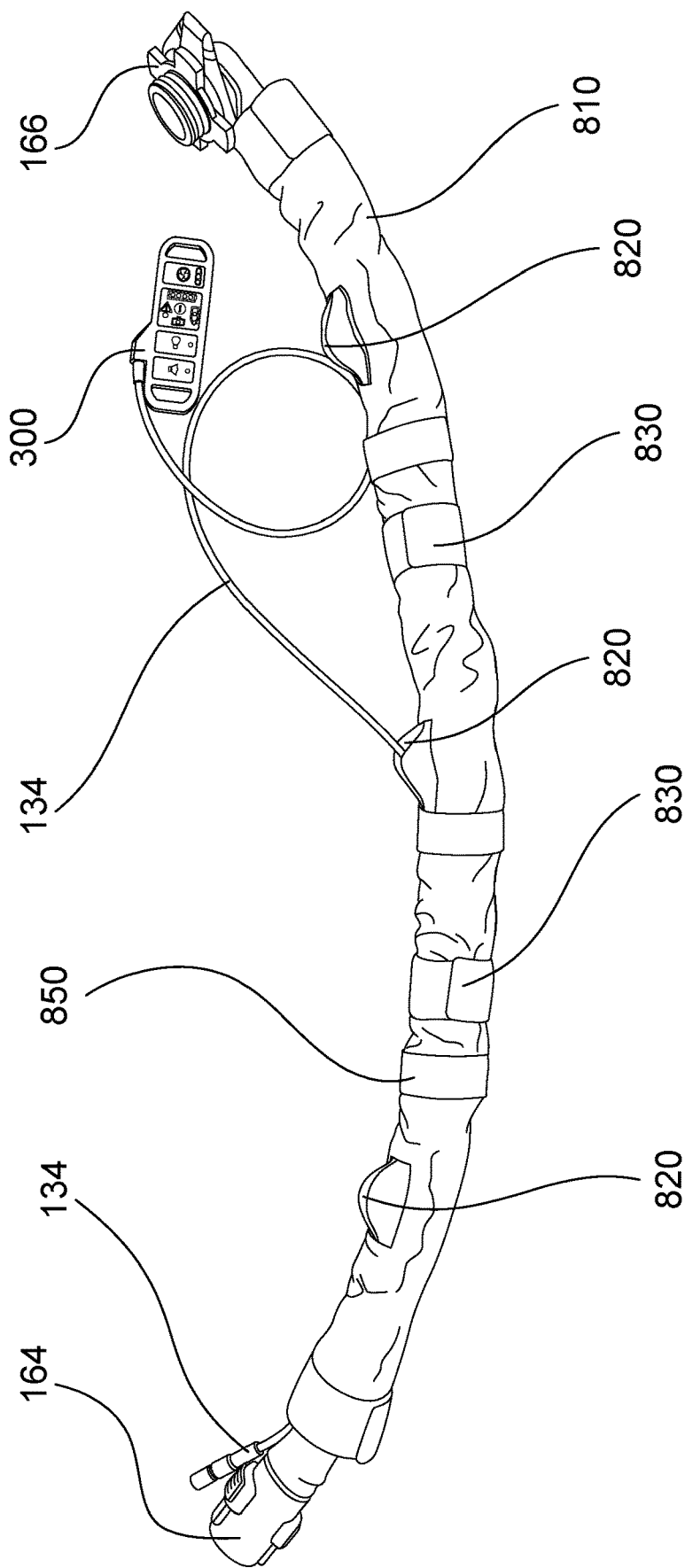
FIG. 18 shows additional details of a hose wrap housing a breathing tube and remote control extension according to certain aspects of the present disclosure.

As shown in the FIG. 18, the hose wrap may be secured around a breathing hose and remote control line, with a plurality of routing openings 820 disposed along the length of the wrap 810, which can allow for various routings of additional wires, cables and/or tubes such as microphone and/or headset wires, hydration tubes, etc.

Figure 19:
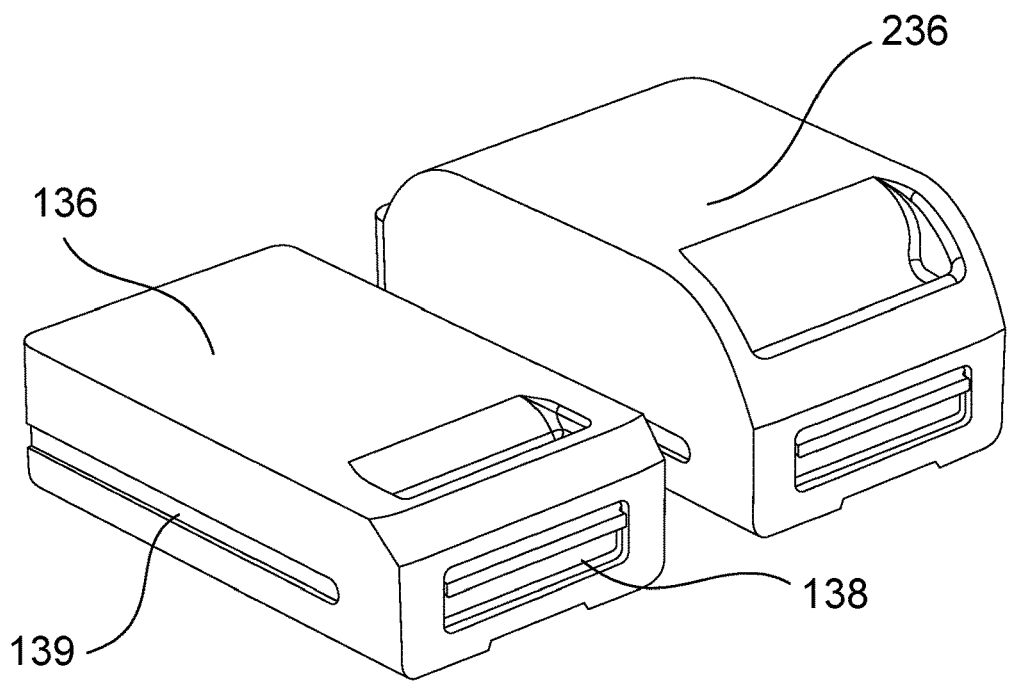
FIG. 19 shows batteries configured to be used with a modular breathing apparatus according to certain aspects of the present disclosure.

FIG. 19 shows batteries 136, 236 configured to be used with a modular breathing apparatus according to certain aspects of the present disclosure. As mentioned previously, battery 136 may include a quick-release 138 for securing and removing the battery 136 from the modular breathing apparatus. The battery 136 may be sized to fit within an exposed portion of the control/power unit 130, and may include surface contours that cooperate with corresponding contours of the exposed portion of the control/power unit 130 to help seat the battery. Various sized batteries with different capacities may be provided, e.g. by changing the height of the battery. For example, battery 236 may be a high-capacity version of battery 136 and may include extended battery life and/or additional power. In some instances, different batteries may be desirable for use when the modular breathing apparatus is configured in certain ways, requiring more or less power. The battery configurations described herein allow for rapid battery changes in harmful environments and can be performed individually or by teammates without compromising the integrity of the breathing unit. The inventors have further found that, according to aspects of the invention, a portable power pack such as shown in FIG. 19 can operate a PAPR unit as described herein more than 6 hours.

Figure 20:
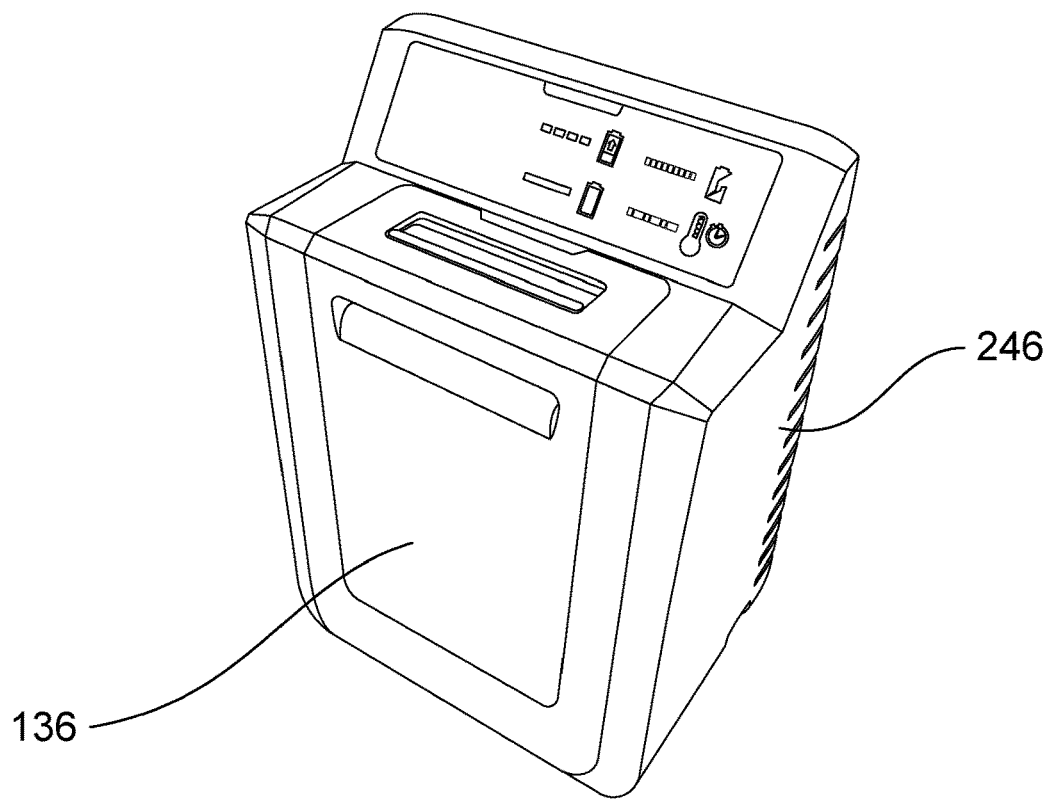
FIG. 20 shows an exemplary battery charger for use with the batteries shown in FIG. 20.

FIG. 20 shows an exemplary battery charger for use with the batteries shown in FIG. 19.

Unless explicitly stated otherwise, any feature of any embodiment discussed herein may be combined with any feature of any other embodiment discussed herein in similar manner to the examples provided herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed:

1. A powered air purifying respirator (PAPR), comprising:
a control module including a power source;
an ambient gas module including a first housing and a first inlet configured to receive an ambient gas;
a gas filter in fluid communication with the first inlet and configured to filter the ambient gas;
a blower configured to boost at least one of a flow rate or a pressure of the ambient gas entering and/or exiting the gas filter;
a non-ambient gas module including a second housing and a second inlet that is independent from the first inlet and configured to receive a non-ambient gas;
a first outlet configured to selectively provide a breathing gas to a user from at least one of the ambient gas or the non-ambient gas; and
a switching device configured to select between the first inlet and the second inlet as a source of the breathing gas,
wherein the gas filter, the ambient gas module, the non-ambient gas module, and the control module are configured to be joined together in an integral unit, and
wherein the respirator is modular and configured to be operable in a plurality of different assemblies including a combination ambient and non-ambient gas assembly in which the non-ambient gas module is mounted between the control module and the ambient gas module with the non-ambient gas module configured to selectively provide fluid communication between the control module and the ambient gas module, and an ambient gas-only assembly in which the non-ambient gas module is entirely removed from the integral unit and the ambient gas module is attached directly to the control module in place of the non-ambient gas module.

2. The respirator of claim 1, wherein the control module is configured to control an ambient gas module setting and a non-ambient gas module setting, the control module including a breathing hose adapter in fluid communication with the first outlet, and a mounting interface configured to join directly to the blower in the ambient gas-only assembly and directly to the non-ambient gas module in the combination ambient and non-ambient gas assembly, wherein the housing of the non-ambient gas module is configured to mount the non-ambient gas module between the blower and the control module in the combination ambient and non-ambient gas assembly.

3. The respirator of claim 2, wherein the controller is configured to at least one of automatically select, or recommend selection of, the source of the breathing gas based at least in part on a first sensor input.

4. The respirator of claim 3, wherein the first sensor input is at least one of an oxygen level of the ambient gas, a pollutant level in the ambient gas, a filter effectiveness, a pressure associated with the non-ambient gas, or a flow rate associated with the non-ambient gas.

5. The respirator of claim 1, wherein the switching device is configured to activate use of the non-ambient gas module and disable functionality of the ambient gas module.

6. The respirator of claim 5, wherein activation of the non-ambient gas module blocks the air path of the ambient gas module.

7. The respirator of claim 1, wherein the respirator is configured to operate via the first inlet without the second inlet being connected to a non-ambient gas source, and to operate via the second inlet without using the blower or the gas filter.

8. The respirator of claim 1, wherein the blower includes a centrifugal impeller configured to force the ambient gas through the gas filter.

9. The respirator of claim 1, wherein the non-ambient gas source is at least one of a pressurized air tank, a pressurized oxygen tank, or a gas line.

10. The respirator of claim 1, further comprising a breathing tube in fluid communication with the first outlet, a breathing mask connected to the breathing tube via a breathing tube to breathing mask interface, and an indicator disposed proximate to the breathing tube to breathing mask interface, the indicator including at least one of a visual warning indicator, an audio warning indicator, or a haptic warning indicator.

11. The respirator of claim 10, wherein the indicator is integrated in a heads-up display (HUD) and includes a visual warning indicator that is visible to a user while wearing the breathing mask.

12. The respirator of claim 11, wherein the HUD is configured to be repositioned while attached to the breathing tube to breathing mask interface such that the visual indicator is no longer visible to the user through the breathing mask.

13. The respirator of claim 12, wherein the HUD is configured to be affixed directly to the breathing tube to breathing mask interface, and the breathing tube to breathing mask interface contains detents to allow for repositioning of the HUD.

14. The respirator of claim 1, further comprising a remote control configured to control at least one of a power fan speed and user interface (UI) settings, and including at least one of a battery warning indicator, a clog warning indicator, an SCBA setting indicator, a PAPR setting indicator, an SCBA mode setting, or a PAPR mode setting.

15. The respirator of claim 14, wherein the remote control is configured to disable at least one of audio alerts or visual alerts.

16. The respirator of claim 1, wherein the second housing includes a removable attachment mechanism configured to secure the respirator to a compressed air tank and to allow a user to release the removable attachment mechanism from the respirator.

17. The respirator of claim 1, further comprising: a heads-up display (HUD) including a visual warning indicator that is visible to a user; and a remote control configured to control an ambient gas module setting and a non-ambient gas module setting, wherein the HUD and the remote control share a common connection point to the respirator such that both may be integrated through a single electrical connector to the respirator system.

18. The respirator of claim 1, wherein the control module includes at least one of control board firmware and stored software that are configured to be updated via an electrical interface port on the respirator.

19. The respirator of claim 1, wherein the control module is configured to automatically adjust a motor speed of the blower based at least in part on a detected flow rate.

* * * * *